US010552065B2

(12) United States Patent
Teranishi et al.

(10) Patent No.: US 10,552,065 B2
(45) Date of Patent: *Feb. 4, 2020

(54) STORAGE APPARATUS INCLUDING NONVOLATILE MEMORY

(71) Applicant: Toshiba Memory Corporation, Tokyo (JP)

(72) Inventors: Masaomi Teranishi, Kanagawa (JP); Keisuke Sato, Kanagawa (JP); Shuichi Sakurai, Kanagawa (JP); Masahiko Nakashima, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,634

(22) Filed: Oct. 26, 2018

(65) Prior Publication Data

US 2019/0065084 A1  Feb. 28, 2019

Related U.S. Application Data

(63) Continuation of application No. 15/693,437, filed on Aug. 31, 2017, now Pat. No. 10,175,901.

(30) Foreign Application Priority Data

Mar. 24, 2017  (JP) ................................ 2017-059838

(51) Int. Cl.
*G06F 3/00* (2006.01)
*G06F 3/06* (2006.01)
(Continued)

(52) U.S. Cl.
CPC .......... *G06F 3/0622* (2013.01); *G06F 3/0637* (2013.01); *G06F 3/0659* (2013.01);
(Continued)

(58) Field of Classification Search
CPC .... G06F 3/0622; G06F 3/0637; G06F 3/0659; G06F 3/0688; G06F 12/14; G06F 12/1416; G06F 12/1458
See application file for complete search history.

(56) References Cited

U.S. PATENT DOCUMENTS 7,482,934 B2  1/2009 Nakamura et al.
7,496,704 B2  2/2009 Tanaka
(Continued)

FOREIGN PATENT DOCUMENTS

JP  2005-210676 A  8/2005
JP  2010-128723 A  6/2010
(Continued)

*Primary Examiner* — Midys Rojas
(74) *Attorney, Agent, or Firm* — Kim & Stewart LLP

(57) ABSTRACT

A storage apparatus includes a first memory, which is nonvolatile, a first controller that controls the first memory, a wireless antenna, a second memory, which is operable based on power supplied from the wireless antenna, and a second controller that is operable based on the power supplied from the wireless antenna, and performs communication using the wireless antenna. When performing communication with an external apparatus using the wireless antenna, the second controller performs authentication of the external apparatus, and stores in the second memory an authentication result indicating whether the authentication succeeded or failed. If the authentication result indicates that the authentication succeeded, the second controller permits reading by the external apparatus of first data from the second memory by communication using the wireless antenna or writing by the external apparatus of second data to the second memory by communication using the wireless antenna.

20 Claims, 13 Drawing Sheets

(51) Int. Cl.
    *H04B 7/24*     (2006.01)
    *G06F 12/14*     (2006.01)

(52) U.S. Cl.
    CPC .......... *G06F 3/0688* (2013.01); *G06F 12/14* (2013.01); *G06F 12/1416* (2013.01); *G06F 12/1458* (2013.01); *H04B 7/24* (2013.01)

(56) References Cited

U.S. PATENT DOCUMENTS

| | | |
|---|---|---|
| 7,873,767 B2 | 1/2011 | Moritani et al. |
| 7,996,911 B2 | 8/2011 | Yoshida et al. |
| 8,255,706 B2 | 8/2012 | Chen et al. |
| 8,576,053 B2 | 11/2013 | Buscemi et al. |
| 8,688,870 B2 | 4/2014 | Shiba |
| 9,269,038 B2 | 2/2016 | Ikemoto et al. |
| 2005/0138798 A1 | 6/2005 | Sakama et al. |
| 2007/0252706 A1 | 11/2007 | Furutani |
| 2014/0246504 A1 | 9/2014 | Ikemoto et al. |

FOREIGN PATENT DOCUMENTS

| | | |
|---|---|---|
| JP | 4667397 B2 | 4/2011 |
| JP | 2011-108139 A | 6/2011 |
| JP | 4893130 B2 | 3/2012 |
| JP | 4991878 B2 | 8/2012 |
| JP | 2012-203475 A | 10/2012 |
| JP | 2014-154777 A | 8/2014 |
| JP | 5788757 B2 | 10/2015 |
| WO | 2006/075359 A1 | 7/2006 |

STORAGE APPARATUS INCLUDING NONVOLATILE MEMORY

CROSS-REFERENCE TO RELATED APPLICATIONS

This application is a continuation of U.S. patent application Ser. No. 15/693,437, filed on Aug. 31, 2017, which is based upon and claims the benefit of priority from Japanese Patent Application No. 2017-059838, filed on Mar. 24, 2017, the entire contents of each of which are incorporated herein by reference.

FIELD

Embodiments described herein relate generally to a storage apparatus including a nonvolatile memory.

BACKGROUND

A storage apparatus which is detachably mountable on an electronic apparatus and including a nonvolatile memory is widely used. If such a storage apparatus is mounted on an electronic apparatus, the electronic apparatus is able to write data to the storage apparatus and read data from the storage apparatus. An example of the storage apparatus which is detachably mountable on an electronic apparatus includes a memory card which is provided with a wireless antenna and is capable of wirelessly communicating with an external apparatus.

DETAILED DESCRIPTION

Figure 1:
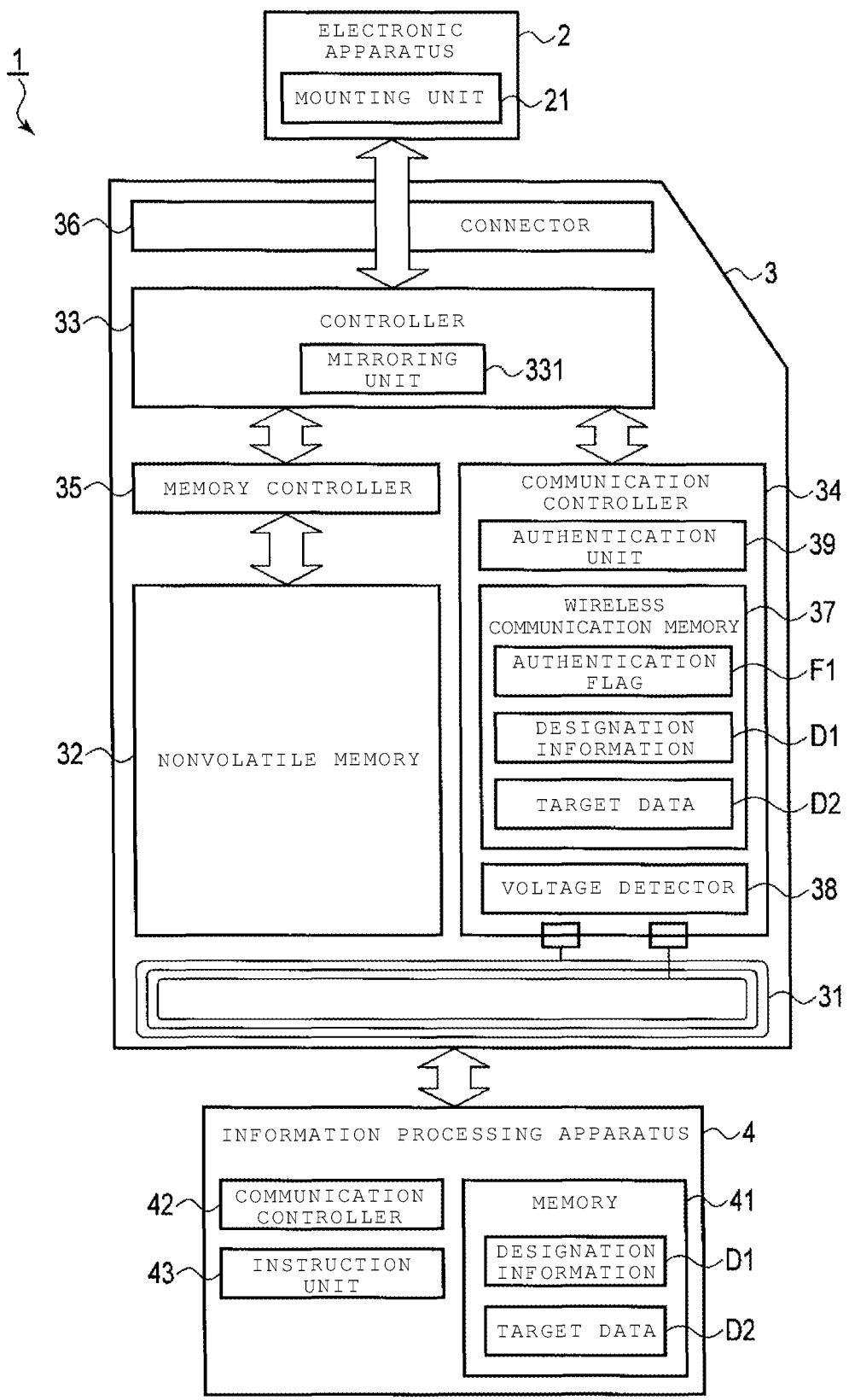
FIG. 1 is a block diagram illustrating an example of a configuration of a storage apparatus having a wireless communication function according to a first embodiment and an information processing system including the storage apparatus.

In general, according to one embodiment, a storage apparatus includes a first memory, which is nonvolatile, a first controller that controls the first memory, a wireless antenna, a second memory, which is operable based on power supplied from the wireless antenna, and a second controller that is operable based on the power supplied from the wireless antenna, and performs communication using the wireless antenna. The second controller, when performing communication with an external apparatus using the wireless antenna, performs authentication of the external apparatus, and stores in the second memory an authentication result indicating whether the authentication succeeded or failed. If the authentication result indicates that the authentication succeeded, the second controller permits reading by the external apparatus of first data from the second memory by communication using the wireless antenna or writing by the external apparatus of second data to the second memory by communication using the wireless antenna. If the authentication result indicates that the authentication failed, the second controller prohibits reading by the external apparatus of any data from the second memory by communication using the wireless antenna or writing by the external apparatus of any data to the second memory by communication using the wireless antenna.

Hereinafter, respective embodiments will be described with reference to the drawings. In the following description, approximately or substantially the same functions and components are denoted by the same reference numerals, and a description will be given as necessary.

First Embodiment

In the present embodiment, a description will be given on a storage apparatus having a wireless communication function (hereinafter, referred to as a wireless storage apparatus) and an information processing system including the wireless storage apparatus.

In the present embodiment, the user moves the information processing apparatus close to, or brings it into contact or close contact with the wireless storage apparatus. This enables the information processing apparatus and the wireless storage apparatus to perform wireless communication. When communicating with the information processing apparatus in a wireless manner, the wireless storage apparatus authenticates the information processing apparatus. The wireless storage apparatus permits reading and writing of data using wireless communication from the information processing apparatus when authentication succeeds. Conversely, when authentication fails, the wireless storage apparatus prohibits reading and writing of data using wireless communication from the information processing apparatus.

In the present embodiment, it is assumed that ID represents identification information. Further, it is assumed that access represents one or both of writing and reading of data to and from the storage apparatus.

In the present embodiment, turning on a flag means rewriting a state value indicating that the flag is valid (for example, "1") to the flag, and turning off a flag means rewriting a state value indicating that the flag is invalid (for example, "0") to the flag.

FIG. 1 is a block diagram illustrating an example of a configuration of a wireless storage apparatus according to the present embodiment and an information processing system including the wireless storage apparatus.

The information processing system 1 includes an electronic apparatus 2, a wireless storage apparatus 3, and an information processing apparatus 4.

The electronic apparatus 2 may be, for example, toys, smart watches, game machines, mobile phones, information processing apparatuses, computers, wearable terminals, digital cameras, control devices, or the like. The electronic apparatus 2 includes a mounting unit 21 into which the wireless storage apparatus 3 is detachably mounted.

The wireless storage apparatus 3 is capable of wirelessly communicating with, for example, an external apparatus such as the information processing apparatus 4, and may be, for example, various storage apparatuses such as a memory card (an SD memory card, a multimedia card, or the like), a universal serial bus (USB) memory, a hard disk drive (HDD), and a solid state disk (SSD). In the present embodiment, a description will be given on a case where the wireless storage apparatus 3 is a memory card.

In the present embodiment, the wireless storage apparatus 3 performs, for example, wireless communication conforming to near field communication (NFC) which is the short-range wireless communication standard at a frequency of 13.56 MHz or the like. However, the wireless communication by the wireless storage apparatus 3 may be, for example, various types of wireless communication such as a wireless local area network (wireless LAN). In the NFC, it is possible to communicate at lower power than a general wireless LAN.

If the wireless storage apparatus 3 is mounted on the electronic apparatus 2, the wireless storage apparatus 3 is electrically connected to the electronic apparatus 2, and is supplied with power from the electronic apparatus 2. The wireless storage apparatus 3 is able to transmit data to the electronic apparatus 2 and receive data from the electronic apparatus 2. The wireless storage apparatus 3 has a function of communicating data with an external apparatus such as the information processing apparatus 4 by using power generated by electromagnetic induction of the wireless antenna 31 even if power is not supplied from the electronic apparatus 2. In other words, the wireless storage apparatus 3 performs, for example, wireless communication, and can transmit data to the information processing apparatus 4 and receive data from the information processing apparatus 4. In the wireless storage apparatus 3, at least some components are operable based on the power generated by electromagnetic induction based on radio waves emitted from the information processing apparatus 4, even if power is not supplied from the electronic apparatus 2.

Although the wireless storage apparatus 3 communicates data with the electronic apparatus 2 according to, for example, a wired interface such as an SD interface in the present embodiment, other interfaces may be used. Further, although the wireless storage apparatus 3 communicates data with the information processing apparatus 4 by using, for example, an NFC interface, other wireless communication interfaces may be used.

The wireless storage apparatus 3 includes a wireless antenna 31, a nonvolatile memory 32, a controller 33, a communication controller 34, a memory controller 35, and a connector 36. The controller 33 includes a mirroring unit 331. The communication controller 34 includes a wireless communication memory 37, a voltage detector 38, and an authentication unit 39. The wireless communication memory stores an authentication flag F1, designation information D1, and target data D2.

The authentication flag F1 is a flag indicating whether or not the wireless storage apparatus 3 succeeds in authenticating the information processing apparatus 4 which is a wireless communication partner. In the case of authentication success, the authentication flag F1 is turned on, and in the case of authentication failure or non-authentication, the authentication flag F1 is turned off.

The designation information D1 is information for designating data to be read from the nonvolatile memory 32 or data to be written to the nonvolatile memory 32. The designation information D1 includes, for example, information indicating the address, size, type, attribute, extension, or the like of the data. The designation information D1 may include, for example, commands such as a read command and a write command. Further, the designation information D1 may be, for example, information for designating an area of the nonvolatile memory 32 or the wireless communication memory 37 that performs writing or reading.

In the present embodiment, the type of data may be distinguished depending on the use of data such as a management data and user data, may be distinguished based on identification information indicating the type of the electronic apparatus 2, which is attached to data, or may be distinguished based on the contents of data such as text data, image data, and sound data. The type of the electronic apparatus 2 may be distinguished based on the manufacturer, model number, version, or the like of the electronic apparatus 2, or may be distinguished by functions of a product such as a mobile phone, a camera, a computer, or the like. The types of data items and the types of the electronic apparatus 2 are merely examples, and there may be various modifications.

The designation information D1 may include, for example, information designating data or an area to be subjected to mirroring, which will be described later.

The target data D2 is data read from the nonvolatile memory 32 or data to be written to the nonvolatile memory 32. According to the read command received from the information processing apparatus 4, the wireless storage apparatus 3 transmits the target data D2, which is read from the nonvolatile memory 32 and stored in the wireless communication memory 37, to the information processing apparatus 4. According to the write command received from the information processing apparatus 4, the wireless storage apparatus 3 writes the target data D2, which is received from the information processing apparatus 4 and stored in the wireless communication memory 37, to the nonvolatile memory 32.

In addition, the communication controller 34 and the wireless communication memory 37 may be separated from each other. The controller 33, the communication controller 34, and the memory controller 35 can be combined or separated. For example, the memory controller 35 may be included in the controller 33. The memory controller 35 and the controller 33 may be integrated into one chip.

The controller 33, the memory controller 35, and the nonvolatile memory 32 operate, when the wireless storage apparatus 3 is supplied with power from the electronic apparatus 2. When the wireless storage apparatus 3 is supplied with power only through the wireless antenna 31 and is not supplied with power from the electronic apparatus 2, the controller 33, the memory controller 35, and the nonvolatile memory 32 may not have sufficient power to operate. Meanwhile, the communication controller 34 is operable, even if the wireless storage apparatus 3 is supplied with power through the wireless antenna 31, and is not supplied with power from the electronic apparatus 2. In other words, if the wireless antenna 31 receives wireless radio waves of a predetermined frequency corresponding to NFC, the communication controller 34 is operable, and the wireless storage apparatus 3 can perform communication by NFC.

The controller 33 receives commands, addresses, data, information, instructions, signals, or the like, from the electronic apparatus 2, the memory controller 35, and the communication controller 34. The controller 33 is a bridge controller that controls transmission and reception of data between, for example, the memory controller 35 and the communication controller 34.

The controller 33 outputs the commands, the addresses, the data, the information, the instructions, the signals, or the like, to the memory controller 35, the communication controller 34, and the electronic apparatus 2, based on the received command.

The controller 33 includes a mirroring unit 331, which is, in one embodiment, implemented as a circuit. The mirroring unit 331 reads the authentication flag F1 stored in the wireless communication memory 37, and when the authentication flag F1 indicates authentication success, the mirroring unit 331 performs synchronization of the data included in the nonvolatile memory 32 and the data included in the wireless communication memory 37. Here, the mirroring means making contents of data the same between two or more memories. For example, when the wireless storage apparatus 3 is supplied with power from the electronic apparatus 2, the mirroring unit 331 may perform mirroring, or when the data of at least one of the nonvolatile memory 32 and the wireless communication memory 37 is written or updated, the mirroring unit 331 may perform mirroring. Further, the mirroring unit 331 may read, for example, the authentication flag F1 stored in the wireless communication memory 37, and when the authentication flag F1 indicates authentication success, the mirroring unit 331 may perform the mirroring.

More specifically, when the authentication flag F1 indicates authentication success and the wireless communication is permitted, the controller 33 reads the designation information D1 stored in the wireless communication memory 37 through the communication controller 34, reads the target data D2 indicated by the designation information D1 from the nonvolatile memory 32 through the memory controller 35, and stores the read target data D2 in the wireless communication memory 37 through the communication controller 34. Conversely, when the authentication flag F1 indicates authentication success and the wireless communication is permitted, the controller 33 may read the target data D2 indicated by the designation information D1 from the wireless communication memory 37 through the communication controller 34, and may store the read target data D2 in the nonvolatile memory 32 through the memory controller 35.

Further, when the authentication flag F1 indicates authentication success and the wireless communication is permitted, the controller 33 reads the target data D2 and the designation information D1 stored in the wireless communication memory 37 through the communication controller 34, and stores the read target data D2 in the area of the nonvolatile memory 32 indicated by the designation information D1 through the memory controller 35.

The memory controller 35 controls the nonvolatile memory 32. The memory controller 35 writes data to the nonvolatile memory 32, for example, based on the commands or the like which are input from the controller 33. The memory controller 35 reads data from the nonvolatile memory 32 and outputs the data to the controller 33, for example, based on the commands or the like which are input from the controller 33.

The nonvolatile memory 32 may be, for example, a nonvolatile semiconductor memory. The nonvolatile memory 32 is, for example, a NAND flash memory, but may be another nonvolatile semiconductor memory such as a NOR flash memory, a magnetoresistive random access memory (MRAM: a magnetoresistive memory), a phase-change random access memory (PRAM: a phase-change memory), a resistive random access memory (ReRAM: a resistance-change memory), and a ferroelectric random access memory (FeRAM). For example, the nonvolatile memory 32 maybe another nonvolatile memory, a magnetic memory, or the like. For example, the nonvolatile memory 32 may be a flash memory of a three-dimensional structure.

The wireless antenna 31 is, for example, a PCB pattern antenna. The possible operation frequency band of the wireless antenna 31 may be a predetermined frequency band corresponding to NFC.

The wireless antenna 31 is capable of generating power by electromagnetic induction, based on, for example, the radio waves emitted from the information processing apparatus 4. The wireless antenna 31 supplies the generated power to the communication controller 34.

The wireless antenna 31 receives commands, addresses, data, information, instructions, signals, or the like, from the information processing apparatus 4. The wireless antenna 31 outputs the received command, or the like, to the communication controller 34.

The communication controller 34 performs communication with the information processing apparatus 4 and the like through the wireless antenna 31. The communication controller 34 receives commands, addresses, data, information, instructions, signals, or the like from the controller 33 and the wireless antenna 31. The communication controller 34 outputs, for example, data and the like, to the controller 33 and the wireless antenna 31, based on the received command. The communication controller 34 reads data from the wireless communication memory 37, based on the received command, address, and the like, and outputs the read data to the controller 33, and the wireless antenna 31. The communication controller 34 stores data in the wireless communication memory 37, based on the received command, address, data and the like.

When receiving the command and data through the controller 33 or the wireless antenna 31, the communication controller 34 writes data to the wireless communication memory 37. The communication controller 34, however, may not write the data of the wireless communication memory 37 in some situations.

The commands, the addresses, the data, the information, the instructions, the signals, or the like, which are communicated between the electronic apparatus 2, the controller 33, the memory controller 35, the communication controller 34, the wireless antenna 31, and the like, do not necessarily match in the formats thereof. In other words, as long as commands, addresses, data, information, instructions, signals, or the like may be recognized by both communication parties, there is no need to match the commands, addresses, data, information, instructions, signals, or the like, which are communicated by other parties, in their formats.

The authentication unit 39, which is, in one embodiment, implemented as a circuit, authenticates the information processing apparatus 4. Authentication is, for example, mutual authentication, or the like. In mutual authentication, the authentication unit 39 checks whether or not the private key of the information processing apparatus 4 matches the private key of the wireless storage apparatus 3. For example, the authentication unit 39 receives first authentication key information from the information processing apparatus 4, when performing wireless communication with the information processing apparatus 4. The authentication unit 39 compares second authentication key information stored in the wireless communication memory 37 with the received first authentication key information, and when both match, the authentication unit 39 determines that authentication succeeds, and turns on the authentication flag F1. Further, when the authentication key information pieces do not match, the authentication unit 39 determines that authentication fails and turns off the authentication flag F1.

When the authentication flag F1 indicates authentication success, the authentication unit 39 permits wireless communication to be executed between the wireless storage apparatus 3 and the information processing apparatus 4.

When receiving the designation information D1 and the target data D2 from the information processing apparatus 4 through the wireless antenna 31, the communication controller 34 writes the designation information D1 and the target data D2 in the wireless communication memory 37. In addition, when receiving the designation information D1 from the information processing apparatus 4 through the wireless antenna 31, the communication controller 34 transmits the target data D2 designated by the designation information D1 to the information processing apparatus 4 through the wireless antenna 31.

The communication controller 34 encrypts the target data D2 to be transmitted to the information processing apparatus 4 through the wireless antenna 31 by using the encryption key information stored in the wireless communication memory 37. Further, the communication controller 34 decrypts the encrypted designation information D1 and target data D2, which are received from the information processing apparatus 4 through the wireless antenna 31, by using the encryption key information stored in the wireless communication memory 37. In addition, the authentication key information and the encryption key information may be the same.

The wireless communication memory 37 is, for example, a nonvolatile memory. The wireless communication memory 37 stores data under the control of the communication controller 34 or the memory controller 35. The wireless communication memory 37, in alternative embodiments, may be volatile, and the storage of data in the wireless communication memory 37 may be temporary. In addition, although an electrically erasable programmable read-only memory (EEPROM) is used as the wireless communication memory 37, it is possible to use various memories similarly to the nonvolatile memory 32.

It is desirable that the nonvolatile memory used in the wireless communication memory 37 has lower power consumption per unit volume than that of the nonvolatile memory 32, so as to be operable with the power supplied from the wireless antenna 31. Specifically, a NOR memory may be used as the wireless communication memory 37.

The voltage detector 38 is electrically connected to the wireless antenna 31. The voltage detector 38 detects the voltage supplied from the wireless antenna 31 to the communication controller 34. The voltage detector 38 issues a reset command of communication by NFC, until the voltage reaches a predetermined value at which the communication controller 34 is operable. The communication controller 34 does not perform communication by NFC while receiving the reset command. This reset command allows to prevent an abnormal activation and operation of communication by NFC. When the voltage reaches a predetermined value, the voltage detector 38 may output an operational command to the communication controller 34. Only when receiving the operational command, the communication controller 34 performs communication by NFC.

The connector 36 is, for example, a standardized connection terminal, and electrically connects the wireless storage apparatus 3 with the electronic apparatus 2.

The information processing apparatus 4 may be, for example, mobile phones (including smartphones), computers, game machines, wearable terminals, portable devices, control devices, or the like. The information processing apparatus 4 is able to communicate commands, addresses, data, information, instructions, signals, or the like with the wireless storage apparatus 3.

The information processing apparatus 4 includes, for example, a memory 41, a communication controller 42, and an instruction unit 43, which is, in one embodiment, a programmed processor.

The memory 41 stores the designation information D1 and the target data D2. When reading the target data D2 from the wireless storage apparatus 3, the information processing apparatus 4 transmits designation information D1 designating the target data D2, the read command, and the like to the wireless storage apparatus 3, and receive the target data D2 from the wireless storage apparatus 3. When writing the target data D2 to the wireless storage apparatus 3, the information processing apparatus 4 transmits the target data D2, the designation information D1 designating the writing area of the target data D2, and the write command, to the wireless storage apparatus 3.

Further, the communication controller 42 controls the reception of commands, addresses, data, information, instructions, signals, or the like from the wireless storage apparatus 3 to the information processing apparatus 4.

Further, the communication controller 42 controls the transmission of commands, data, information, instructions, signals, or the like from the information processing apparatus 4 to the wireless storage apparatus 3.

The communication controller 42 encrypts the data to be transmitted to the wireless storage apparatus 3, by using encryption key information stored in the memory 41. In addition, the communication controller 42 decrypts the encrypted data that is received from the wireless storage apparatus 3, by using the encryption key information stored in the memory 41.

The instruction unit 43 transmits a read command or a write command to the wireless storage apparatus 3 through the communication controller 42. Specifically, the instruction unit 43 transmits the read command, the target data D2 to be read or the designation information D1 indicating the area to the wireless storage apparatus 3 through the communication controller 42, and receives the target data D2 from the wireless storage apparatus 3 through the communication controller 42. Further, the instruction unit 43 transmits the write command, the target data D2, and the designation information D1 indicating the write destination, to the wireless storage apparatus 3.

The instruction unit 43 reads the authentication key information from the memory 41, for authentication of the wireless storage apparatus 3, and transmits the authentication key information to the wireless storage apparatus 3 through the communication controller 42.

Figure 2:
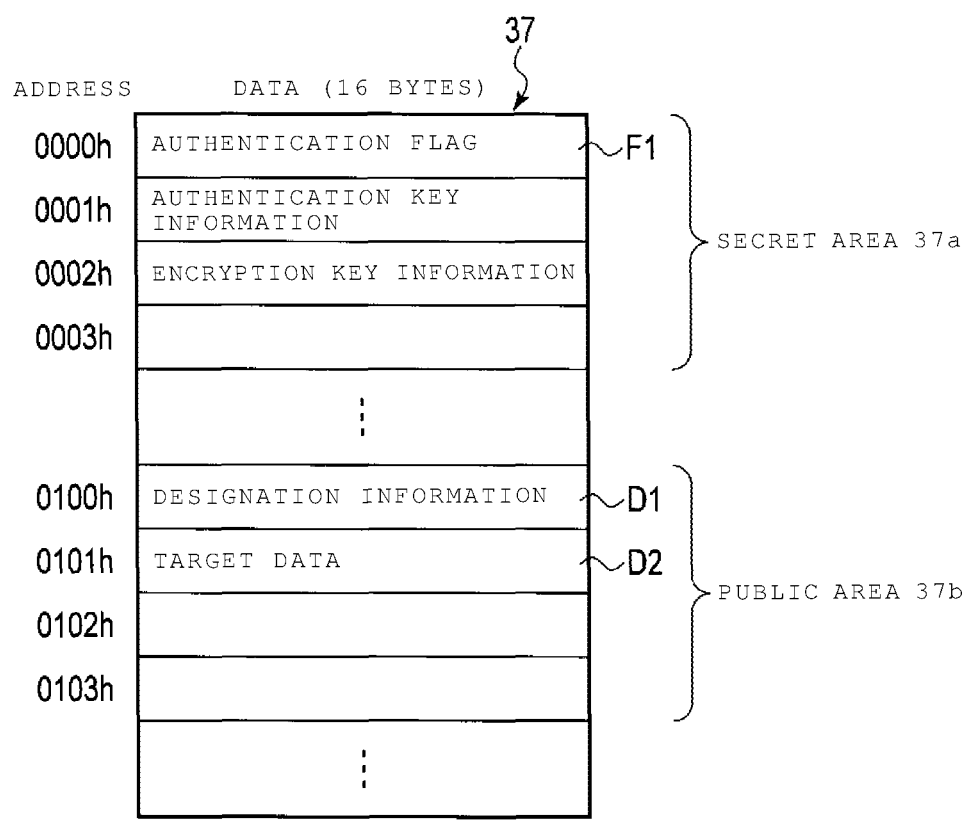
FIG. 2 is a diagram illustrating an example of a wireless communication memory according to the first embodiment.

FIG. 2 is a diagram illustrating an example of the wireless communication memory 37 according to the present embodiment. The allocation of each data item to the address shown in FIG. 2 is an example and can be appropriately changed.

In the memory space of the wireless communication memory 37, for example, 16 bytes of data is allocated to a single address. The size of data allocated to a single address, however, can be changed.

The wireless communication memory 37 includes a secret area 37a that cannot be read from external apparatuses such as the electronic apparatus 2 and the information processing apparatus 4, and a public area 37b that can be read from external apparatuses. For example, the authentication flag F1, the authentication key information, and the encryption key information are stored in the secret area 37a. For example, the designation information D1 and the target data D2 are stored in the public area 37b.

Figure 3:
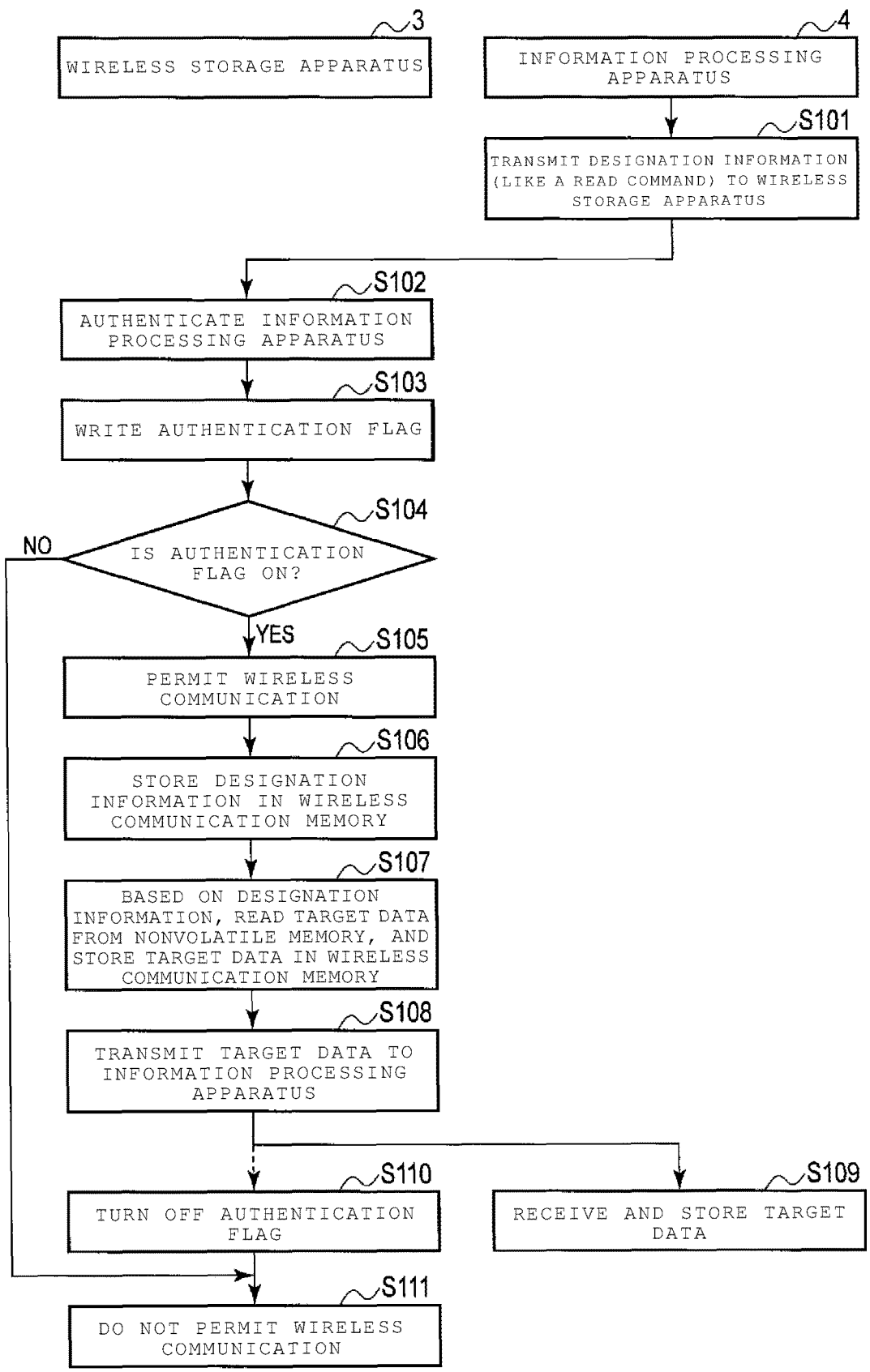
FIG. 3 is a flowchart illustrating a data reading process in which an information processing apparatus according to the first embodiment reads data from a wireless storage apparatus.

FIG. 3 is a flowchart illustrating a data reading process in which the information processing apparatus 4 according to the present embodiment reads data from the wireless storage apparatus 3.

In FIG. 3, it is assumed that the wireless storage apparatus 3 is supplied with power from the electronic apparatus 2 and the controller 33, the memory controller 35, and the nonvolatile memory 32 of the wireless storage apparatus 3 are operable.

In step S101, the instruction unit 43 of the information processing apparatus 4 transmits the designation information D1 to the wireless storage apparatus 3 through the communication controller 42.

In step S102, the authentication unit 39 of the communication controller 34 of the wireless storage apparatus 3 performs authentication on the wireless communication between the information processing apparatus 4 and the wireless storage apparatus 3. The authentication unit 39 receives, for example, the first authentication key information from the information processing apparatus 4 through the wireless antenna 31, and reads the second authentication key information stored in the secret area 37a of the wireless communication memory 37. Then, the authentication unit 39 compares the first authentication key information with the second authentication key information. If both match, it is determined as authentication success; and if both do not match, it is determined as authentication failure.

In step S103, the authentication unit 39 turns on the authentication flag F1 of the secret area 37a in the case of authentication success, and turns it off in the case of authentication failure.

In step S104, the mirroring unit 331 and communication controller 34 of the controller 33 checks the state of the authentication flag F1, and determines whether the authentication flag F1 is on or not.

When the authentication flag F1 is off, the mirroring unit 331 does not perform mirroring, the process proceeds to step S111, and the communication controller 34 does not permit wireless communication with the information processing apparatus 4.

When the authentication flag F1 is on, the communication controller 34 permits wireless communication with the information processing apparatus 4 in step S105, and stores the designation information D1 received through the wireless antenna 31 from the information processing apparatus 4 in the public area 37b of the wireless communication memory 37 in step S106.

In step S107, the mirroring unit 331 of the controller 33 reads the designation information D1 from the public area 37b through the communication controller 34, reads the target data D2 indicated by the designation information D1 from the nonvolatile memory 32 through the memory controller 35, and stores the read target data D2 in the public area 37b of the wireless communication memory 37 through the communication controller 34.

In step S108, the communication controller 34 transmits the target data D2 stored in the wireless communication memory 37 to the information processing apparatus 4 through the wireless antenna 31.

In step S109, the instruction unit 43 of the information processing apparatus 4 receives the target data D2 from the wireless storage apparatus 3 through the communication controller 42, and stores the target data D2 in the memory 41.

In addition, after the completion of the wireless communication with the information processing apparatus 4, the authentication unit 39 of the communication controller 34 may automatically change the authentication flag F1 to the non-authenticated state (OFF) in step S110. Further, for example, the authentication unit 39 may turn off the authentication flag F1 before power supply from the wireless antenna 31 to the wireless storage apparatus 3 is interrupted.

Thereafter, in step S111, the communication controller 34 does not permit the wireless communication with the information processing apparatus 4.

Figure 4:
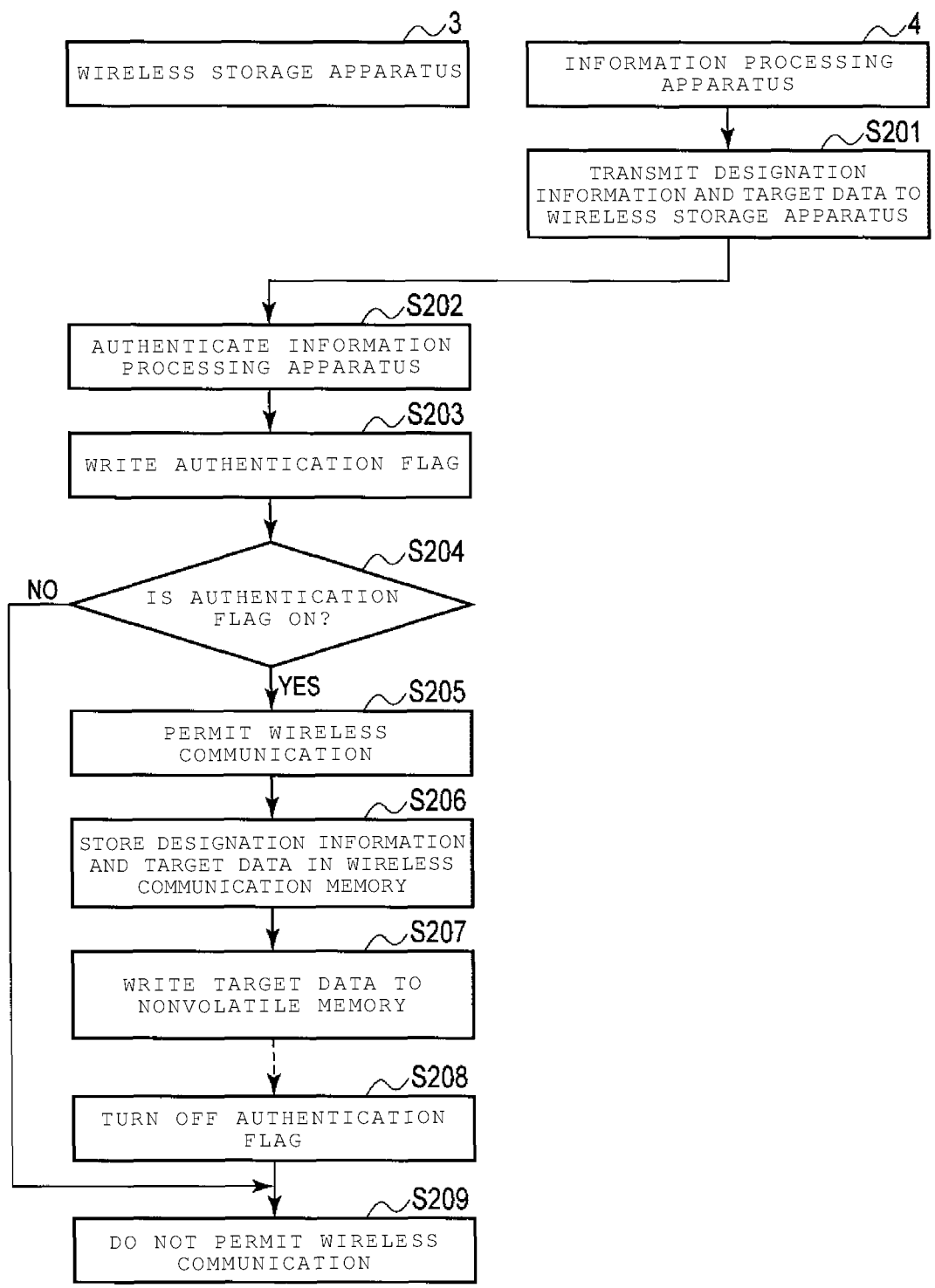
FIG. 4 is a flowchart illustrating a data writing process in which the information processing apparatus according to the first embodiment writes data into the wireless storage apparatus.

FIG. 4 is a flowchart illustrating a data writing process in which the information processing apparatus 4 according to the present embodiment writes data to the wireless storage apparatus 3. In FIG. 4, as in the case of FIG. 3, it is assumed that power is supplied from the electronic apparatus 2 to the wireless storage apparatus 3.

In step S201, the instruction unit 43 of the information processing apparatus 4 transmits the designation information D1 and the target data D2 to the wireless storage apparatus 3 through the communication controller 42.

Since the steps S202 to S205 are the same as the steps S102 to S105 of FIG. 3, the description thereof will be omitted.

When the authentication flag F1 is on, the communication controller 34 stores the designation information D1 and the target data D2 received through the wireless antenna 31 from the information processing apparatus 4 in the public area 37b of the wireless communication memory 37 in step S206.

In step S207, the mirroring unit 331 of the controller 33 reads the designation information D1 and the target data D2 from the public area 37b through the communication controller 34, and writes the target data D2 to the area of the nonvolatile memory 32 indicated by the designation information D1 through the memory controller 35.

When the mirroring unit 331 writes the target data D2 to the nonvolatile memory 32, if it is not necessary to designate information on the target data D2, such as the writing destination of the target data D2, the designation information D1 may not be communicated in the communication between the information processing apparatus 4 and the wireless storage apparatus 3 in FIG. 4.

Since step S208 and step S209 are the same processes as those of step S110 and step S111 of FIG. 3, the description thereof will be omitted.

In the present embodiment described above, data and an area for storing the data are designated by the designation information D1. In the present embodiment, control is performed such that the data items designated by the designation information D1 in the nonvolatile memory 32 and the wireless communication memory 37 become the same by mirroring. Thus, data can be communicated between the electronic apparatus 2 and the information processing apparatus 4 through the wireless storage apparatus 3. For example, the information processing apparatus 4 can acquire the data stored in the nonvolatile memory 32, and the electronic apparatus 2 can acquire the data stored in the wireless communication memory 37. Further, the information processing apparatus 4 can rewrite the data stored in the nonvolatile memory 32, and the electronic apparatus 2 can rewrite the data stored in the wireless communication memory 37. Further, without removing the wireless storage apparatus 3 from the electronic apparatus 2, the information processing apparatus 4 can read the data stored in the wireless storage apparatus 3 and store the data in the wireless storage apparatus 3. Such a wireless storage apparatus 3 is applicable to fields such as control and maintenance of industrial equipment and health equipment. More specifically, the wireless storage apparatus 3 is mounted on industrial equipment corresponding to the electronic apparatus 2, and log data of the industrial equipment is stored in the wireless storage apparatus 3. An administrator carrying the information processing apparatus 4 can receive and collect the log data from the wireless storage apparatus 3 while operating the industrial equipment.

In the present embodiment, data to be mirrored can be designated, such that a memory with a larger capacity between the nonvolatile memory 32 and the wireless communication memory 37 can store one or a plurality of items of data, and store the data selected from the memory with a larger capacity in a memory with a smaller capacity in synchronization with each other. In this case, it is also possible to freely designate data and an area, with respect to any of the nonvolatile memory 32 and the wireless communication memory 37.

In the present embodiment, since it is determined whether to perform mirroring between the nonvolatile memory 32 and the wireless communication memory 37 by using the result of authentication by the authentication unit 39, it is possible to restrict the access to the wireless storage apparatus 3 from the information processing apparatus 4.

In the present embodiment, mirroring is executed promptly at the timing when the power supply from the electronic apparatus 2 to the wireless storage apparatus 3 is started, the timing when the data or area to be mirrored is updated, and the like.

Furthermore, in the present embodiment, the wireless storage apparatus 3 authenticates the information processing apparatus 4 when receiving the read or write command of the target data D2 from the information processing apparatus 4, and only when the authentication succeeds, the wireless storage apparatus 3 permits reading or writing of the target data D2 using wireless communication from the information processing apparatus 4. This can strengthen the security of the wireless communication of the wireless storage apparatus 3.

In the present embodiment, the security can be further strengthened because the target data D2 to be communicated is further encrypted after performing the authentication process between the information processing apparatus 4 and the wireless storage apparatus 3.

In the present embodiment, the private data or the business data to be protected stored in the wireless storage apparatus 3 can be prevented from leaking out and thus properly managed.

In the present embodiment, for example, when the authentication of the information processing apparatus 4 fails, the authentication unit 39 prohibits reading of data from the wireless storage apparatus 3 to the information processing apparatus 4, but may permit writing of data from the information processing apparatus 4 to the wireless storage apparatus 3. On the contrary, when the authentication of the information processing apparatus 4 succeeds, the wireless storage apparatus 3 permits reading of data from the wireless storage apparatus 3 to the information processing apparatus 4, but may prohibit writing of data from the information processing apparatus 4 to the wireless storage apparatus 3. In this way, it is possible to adjust the security level according to the environment in which the wireless storage apparatus 3 is used by giving the degree of freedom to settings relating to permission or prohibition of wireless communication by the authentication unit 39.

In the present embodiment, the authentication flag F1 may be turned on only when the authentication unit 39 succeeds in authentication of the information processing apparatus 4 in a state where the wireless storage apparatus 3 is mounted on the electronic apparatus 2. In this case, the authentication flag F1 is rewritten to ON in the state where the wireless storage apparatus 3 is not mounted on the electronic apparatus 2, and thereafter, the wireless storage apparatus 3 is mounted on an unintended apparatus, and data stored in the nonvolatile memory 32 or the wireless communication memory 37 can be prevented from being read by the unintended apparatus.

In the present embodiment, the secret area 37a of the wireless communication memory 37 may store a power-on flag indicating whether power is turned on or not. The power-on flag is turned on when power is supplied to the controller 33, and is turned off when power is not supplied to the controller 33. The authentication unit 39 may not perform authentication of the information processing apparatus 4 when the power-on flag is off. Further, the authentication unit 39 may change the state of the authentication flag F1 to the non-authentication state (OFF) when the power-on flag is turned off. Thereby, it is possible to prevent the authentication flag from being rewritten while the wireless storage apparatus 3 is not mounted on the electronic apparatus 2.

Second Embodiment

In the present embodiment, a modification of the first embodiment will be described.

The wireless storage apparatus according to the present embodiment operates in either a lock/unlock mode or a read lock mode.

In the present embodiment, locking (e.g., to restrict access) means that reading data from a wireless storage apparatus or writing of data to a wireless storage apparatus is prohibited, and unlocking (e.g., to permit access) means that writing is permitted for a wireless storage apparatus to which writing is prohibited, or reading is permitted for a wireless storage apparatus from which reading is prohibited.

The lock/unlock mode is a mode in which when the user wants to lock or unlock the access to the nonvolatile memory 32, the memory controller 35 locks or unlocks the access to the nonvolatile memory 32, by using the wireless communication from the information processing apparatus 4 to the communication controller 34. In the lock/unlock mode, locking or unlocking means that for example, the controller 33 transmits a lock/unlock command to the memory controller 35, and the memory controller 35 locks or unlocks the access to the nonvolatile memory 32 in response to the lock/unlock command.

The read lock mode is, for example, a mode in which the controller 33 returns the dummy data of data corresponding to the read command to the electronic apparatus 2 that transmitted the command, or a mode in which the controller 33 returns a response indicating that reading is prohibited, to the transmitter of the read command, when the reading from the nonvolatile memory 32 is locked. In the read lock mode, for example, even when reading from the nonvolatile memory 32 is locked, the controller 33 is able to write data corresponding to the write command to the nonvolatile memory 32 through the memory controller 35.

In the present embodiment, it is assumed that the lock/unlock mode and the read lock mode can be switched under the control of the controller 33. The data written to the nonvolatile memory 32 in the read lock mode can be read when the reading from the wireless storage apparatus 3A is unlocked in the lock/unlock mode.

In the present embodiment, the locking or unlocking of the access to the nonvolatile memory 32 of the wireless storage apparatus 3A is also represented simply as the locking or unlocking of the nonvolatile memory 32 or the wireless storage apparatus 3A.

Figure 5:
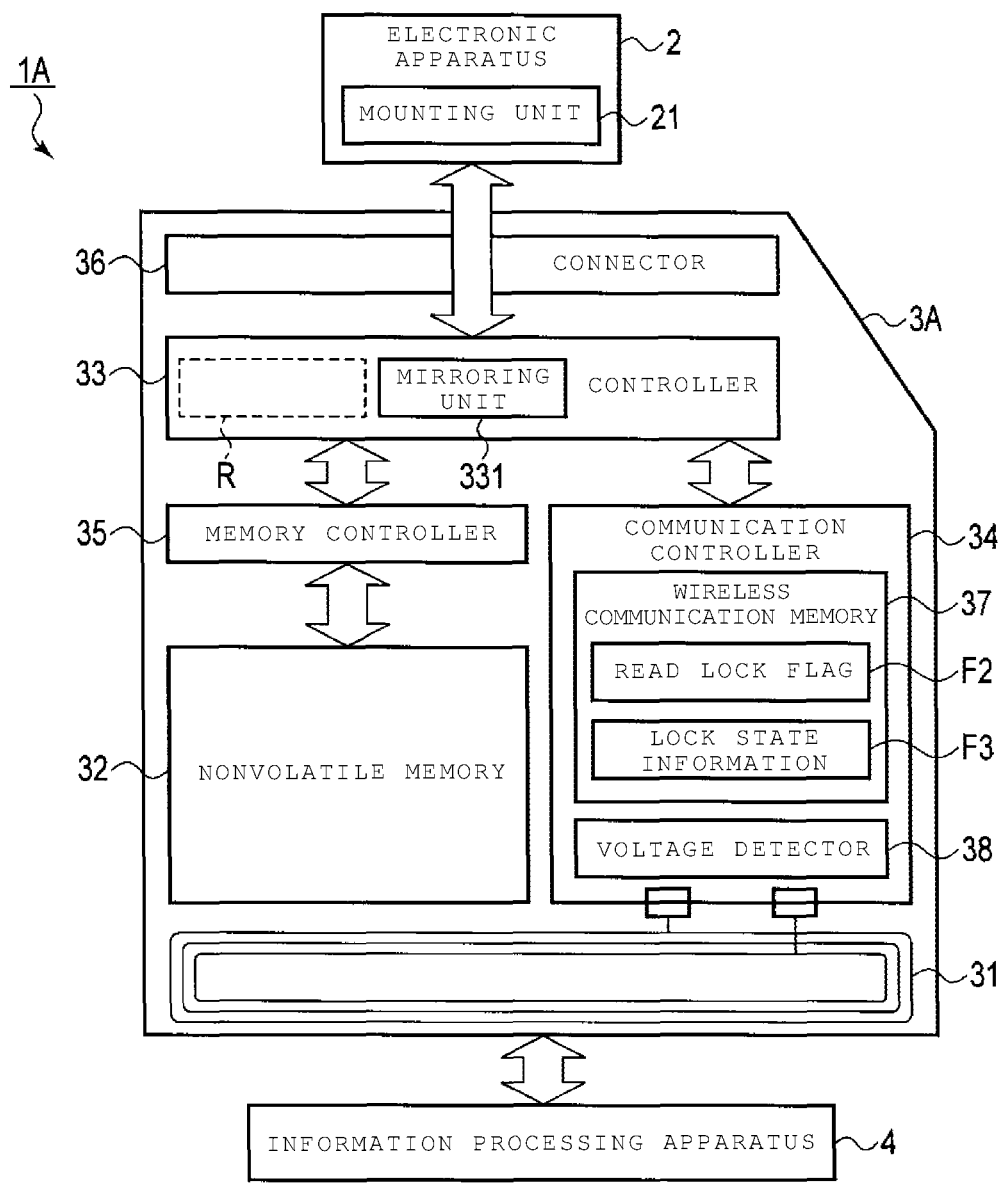
FIG. 5 is a block diagram illustrating an example of a storage apparatus having a wireless communication function according to a second embodiment and an information processing system including the storage apparatus.

FIG. 5 is a block diagram illustrating an example of a configuration of a wireless storage apparatus according to the present embodiment and an information processing system including the wireless storage apparatus.

The information processing system 1A includes an electronic apparatus 2, a wireless storage apparatus 3A, and an information processing apparatus 4. In addition, a description of the same components as those included in the wireless storage apparatus 3 according to the first embodiment of the components included in the wireless storage apparatus 3A will be omitted.

The wireless communication memory 37 of the wireless storage apparatus 3A stores a read lock flag F2 and a lock state information F3.

When operating in the read lock mode, as described later with reference to FIG. 6, the nonvolatile memory 32 is divided into a first area 32A and a second area 32B.

The read lock flag F2 is a flag indicating whether or not the wireless storage apparatus 3A is in the read lock mode. If the wireless storage apparatus 3A is in the read lock mode, the read lock flag F2 is turned on, and if the wireless storage apparatus 3A is not in the read lock mode, the read lock flag F2 is turned off.

The lock state information F3 is used to manage whether or not to prohibit writing or reading of data for the nonvolatile memory 32. When receiving a write command or a read command of data from the electronic apparatus 2, the controller 33 determines whether to permit or prohibit writing or reading of data, based on the lock state information F3.

The lock state information F3 includes, for example, data indicating permission or prohibition of reading, permission or prohibition of writing, permission or prohibition of reading and writing, for the nonvolatile memory 32. The lock state information F3 includes, for example, a plurality of bits, and switches on or off of each bit, thereby realizing four types of lock states of the nonvolatile memory 32: reading and writing possible, reading only possible, writing only possible, and reading and writing prohibition. The mode of the lock state information F3 is not limited to the above.

The read lock flag F2 and the lock state information F3 are changed by receiving an instruction from the information processing apparatus 4, by wireless communication between the wireless storage apparatus 3B and the information processing apparatus 4. The read lock flag F2 maybe changed by receiving an instruction from the electronic apparatus 2, when the wireless storage apparatus 3B is mounted on the mounting unit 21 of the electronic apparatus 2.

In the present embodiment, it is desirable that the read lock flag F2 and the lock state information F3 are stored in the secret area 37a (see FIG. 2) of the wireless communication memory 37. However, the read lock flag F2 and the lock state information F3 may be stored in the public area 37b.

Figure 6:
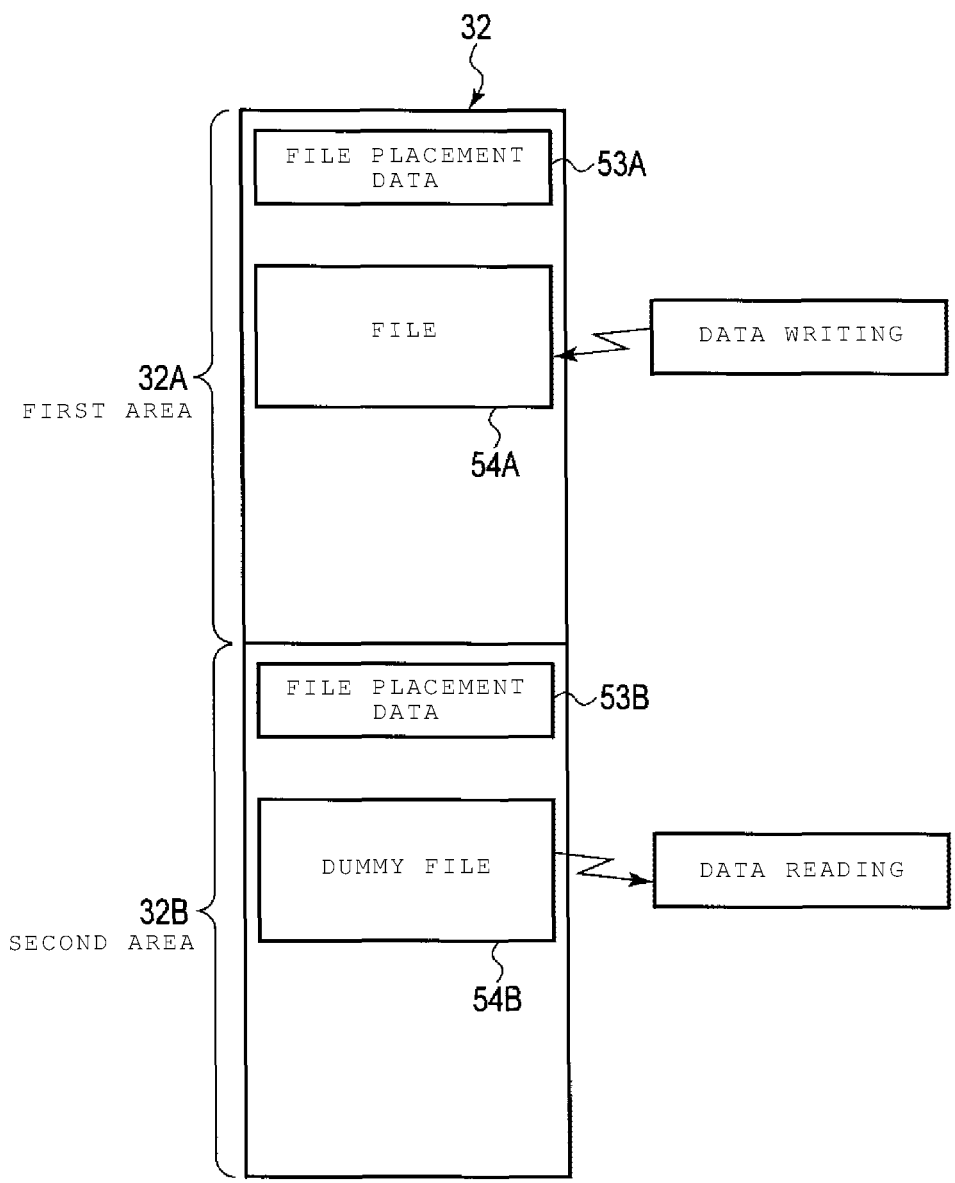
FIG. 6 is a diagram illustrating an example of a state of a nonvolatile memory in a read lock mode according to the second embodiment.

FIG. 6 is a diagram illustrating an example of a state of the nonvolatile memory 32 at the read lock mode according to the present embodiment.

If the wireless storage apparatus 3A operates in the read lock mode, the controller 33 controls the memory controller 35 such that the nonvolatile memory 32 is divided into a first area 32A for data writing and a second area 32B for data reading. For example, the storage capacities of the first area 32A and the second area 32B may be the same.

For example, file placement data 53A and a file 54A are stored in the first area 32A.

The file placement data 53A is associated with the file ID and the position of the file 54A stored in the first area 32A. The controller 33 is able to recognize which file is placed in which position of the first area 32A, with reference to the file placement data 53A, through the memory controller 35.

The file 54A is, for example, an arbitrary file (of user data) which is writable by the user.

On the other hand, the file placement data 53B and the dummy file 54B are stored in the second area 32B.

The file placement data 53B is associated with the file ID and the position of the dummy file 54B stored in the second area 32B. The controller 33 is able to recognize which dummy file 54B is placed in which position of the second area 32B, with reference to the file placement data 53B, through the memory controller 35.

The dummy file 54B is read instead of the file 54A for the reading of the file 54A, in order to ensure the security of the file 54A that is written in the first area 32A. A part of the dummy file 54B may be copied from the file 54A. For example, when a common file is disposed at the addresses common to the first area 32A and the second area 32B, the file can be read in the read lock mode, regardless of the state of the lock state information F3.

The file placement data 53A and the file placement data 53B are stored in, for example, in the file allocation table (FAT) area of the first area 32A and the FAT area of the second area 32B, respectively.

However, the file placement data 53 and the file placement data 53B may be stored, for example, at the heads of the first area 32A and the second area 32B, respectively. The FAT area is an area for storing position information of the file in the memory.

The controller 33 reads the read lock flag F2 and the lock state information F3 from the wireless communication memory 37, through the communication controller 34.

In the wireless storage apparatus 3 in the read lock mode, when the lock state information F3 designates the locking of reading, the controller 33 is able to write the file 54A to the first area 32A of the nonvolatile memory 32, but is not able to read the file 54A from the first area 32A, through the memory controller 35.

In the read lock mode, when receiving the write command from the electronic apparatus 2 through the connector 36, the controller 33 selects the first area 32A as a writing destination. In the read lock mode, when the controller 33 receives a read command from the electronic apparatus 2 through the connector 36, the controller 33 selects the first area 32A as a reading destination if reading is not locked, and selects the second area 32B as a reading destination if reading is locked.

Further, the file placement data 53B and the dummy file 54B are stored in the second area 32B of the nonvolatile memory 32 in the present embodiment, but the controller 33 may store the file placement data 53B and the dummy file 54B in the memory R of the controller 33. The memory R is, for example, a random access memory (RAM) or the like, but without being limited thereto, may be, for example, any one of a static random access memory (SRAM), a dynamic random access memory (DRAM), and various semiconductor memories. If the memory R is a volatile memory, when power is supplied, the controller 33 may read necessary data from the nonvolatile memory 32 through the memory controller 35 and write the read data to the memory R, and immediately before the supply of power is interrupted, the controller 33 may write data of the memory R to the nonvolatile memory 32 through the memory controller 35.

Figure 7:
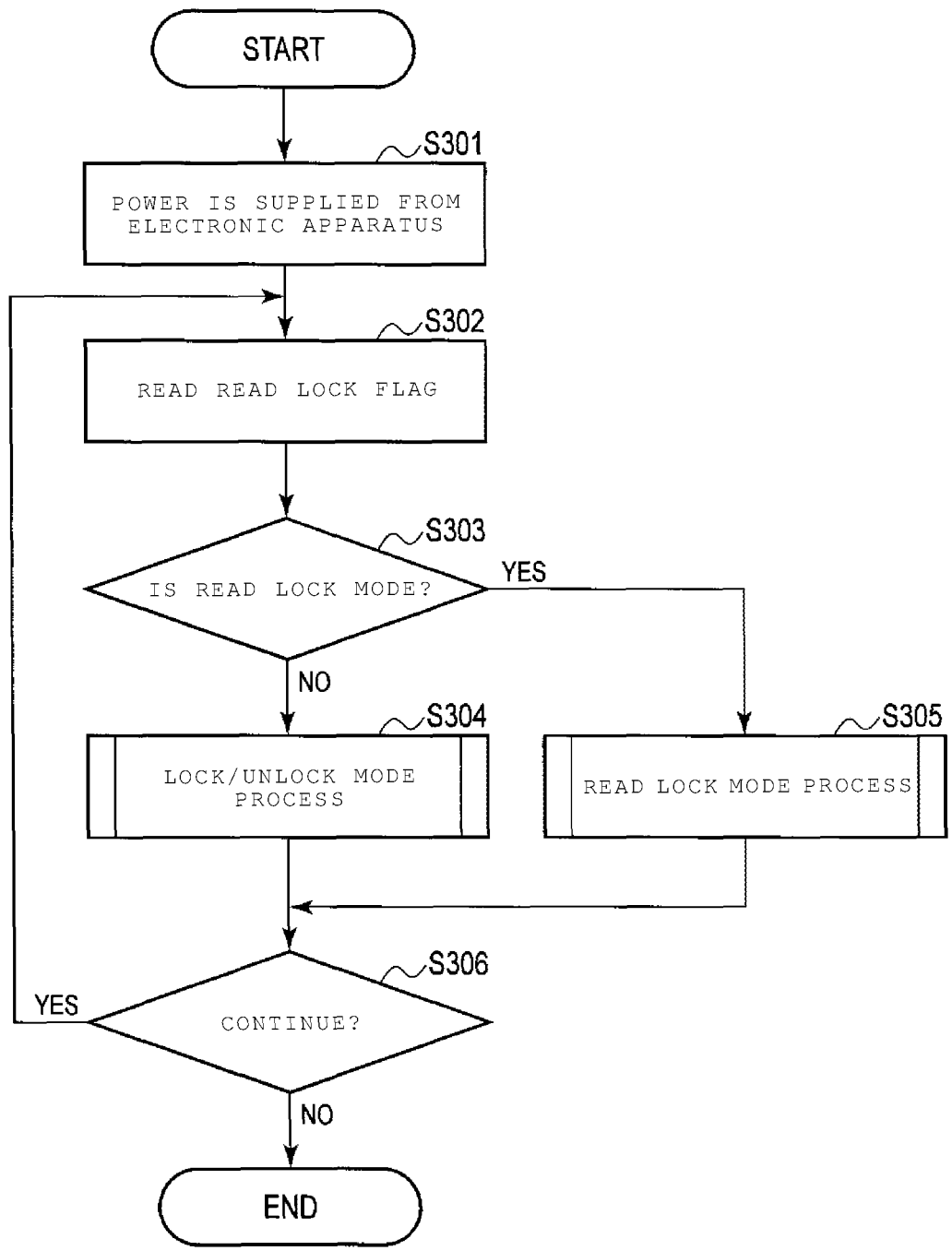
FIG. 7 is a flowchart illustrating an example of a mode determination process of the wireless storage apparatus according to the second embodiment.

FIG. 7 is a flowchart illustrating an example of a mode determination process of the wireless storage apparatus 3A according to the present embodiment.

In step S301, the wireless storage apparatus 3A is supplied with power from the electronic apparatus 2.

In step S302, the controller 33 of the wireless storage apparatus 3A reads the read lock flag F2 from the wireless communication memory 37, through the communication controller 34.

In step S303, the controller 33 determines whether or not the read lock flag F2 is off.

When the read lock flag F2 is off, in step S304, the controller 33 performs the lock/unlock mode process.

When the read lock flag F2 is on, in step S305, the controller 33 performs the read lock mode process. Details of the lock/unlock mode process and the details of the read lock mode process will be described later with reference to FIG. 8 and FIG. 9, respectively.

In step S306, when the process is to be continued, the process returns to step S302. The controller 33 again reads the read lock flag F2 and selects the read lock mode and the lock/unlock mode.

The reading of the read lock flag F2 may be executed, for example, at the timing of access to the wireless storage apparatus 3A from the electronic apparatus 2, or at a timing at which a periodic command is generated, or maybe periodically executed in a state where the wireless storage apparatus 3A is supplied with power from the electronic apparatus 2.

When changing the operation state of the wireless storage apparatus 3A from the lock/unlock mode to the read lock mode, and for example, the information processing apparatus 4 wirelessly communicates with the wireless storage apparatus 3, and rewrites the read lock flag F2 from off to on. Thus, the read lock flag F2 is read at the timing when the process returns to step S302, and it is determined whether it is the lock/unlock mode or the read lock mode. When the wireless storage apparatus 3A is mounted on the electronic apparatus 2, the read lock flag F2 may be rewritten in response to an instruction from the electronic apparatus 2.

Figure 8:
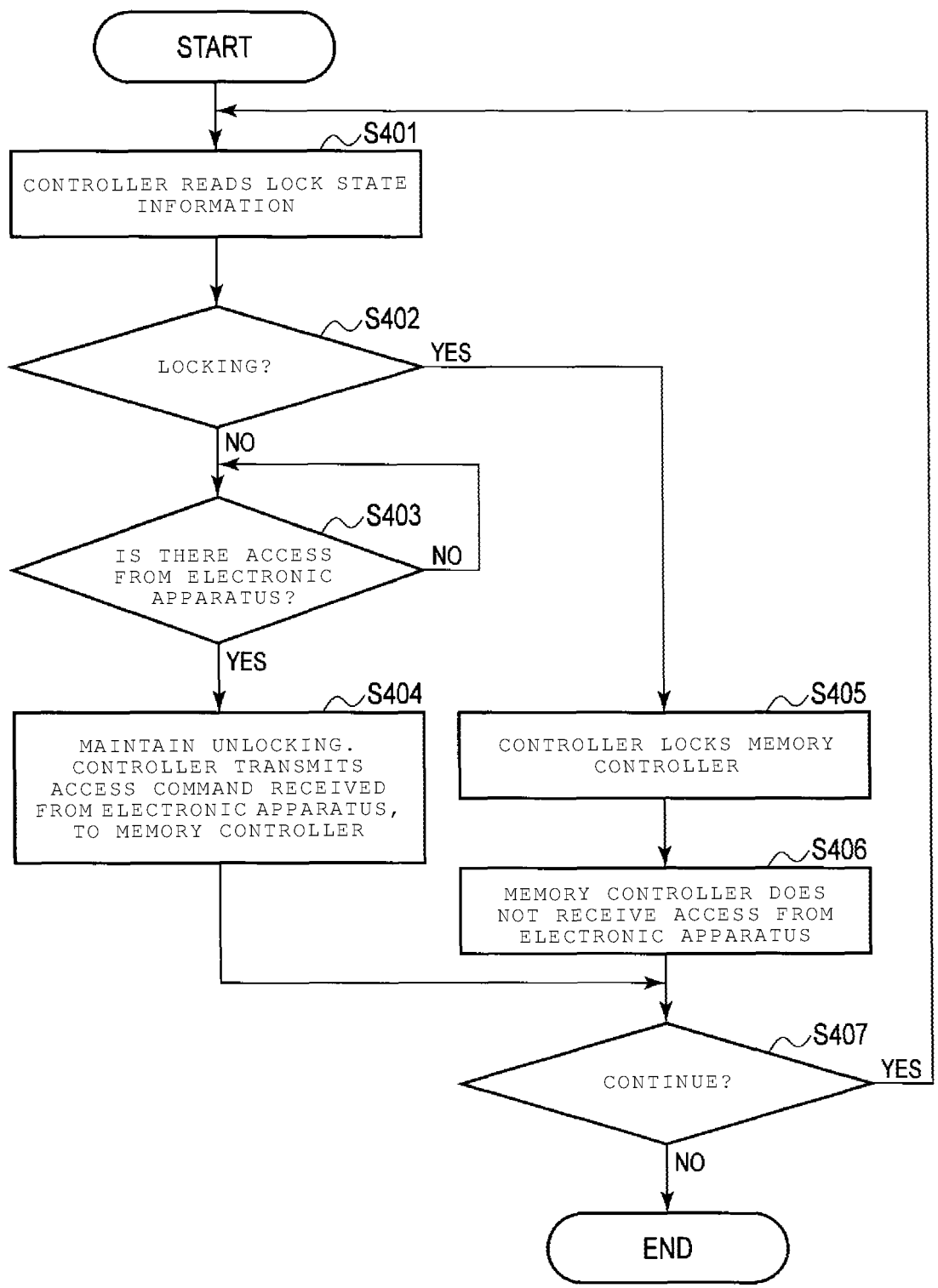
FIG. 8 is a flowchart illustrating an example of a lock/unlock mode process of the wireless storage apparatus according to the second embodiment.

FIG. 8 is a flowchart illustrating an example of the lock/unlock mode process of the wireless storage apparatus 3A according to the present embodiment. The process of FIG. 8 corresponds to step S304 of FIG. 7.

In step S401, the controller 33 reads the lock state information F3 from the wireless communication memory 37, through the communication controller 34. For example, the reading of the lock state information F3 may be periodically executed regardless of occurrence of access from the electronic apparatus 2 to the wireless storage apparatus 3.

In step S402, the controller 33 determines which one of locking and unlocking is designated by the read lock state information F3.

If the lock state information F3 designates unlocking, in step S403, the controller 33 determines whether or not a write command or a read command is received from the electronic apparatus 2 through the connector 36, and repeats the determination of step S403 until the write command or the read command is received.

If the controller 33 receives the write command or the read command, in step S404, the controller 33 maintains the unlocked state, and transmits the received write command or read command to the memory controller 35, and the memory controller 35 performs writing or reading to the nonvolatile memory 32. Thereafter, the process proceeds to step S407.

As a result of the determination in step S402, if the lock state information F3 designates locking, in step S405, the controller 33 transmits a lock command to the memory controller 35. As a result, the memory controller 35 performs locking according to the lock command received from the controller 33.

In step S406, even if the controller 33 transmits to the memory controller 35, the write command or the read command received from the electronic apparatus 2 through the connector 36, and the memory controller 35 does not receive the write command or the read command from the controller 33. Alternatively, even if the write command or the read command is not received from the controller 33, memory controller 35 may ignore or discard the received command.

After step S404 or step S406, the controller 33 determines whether or not to continue the process in step S407. If the process is not to be continued, the process ends; and if the process is to be continued, the process proceeds to step S401.

Figure 9:
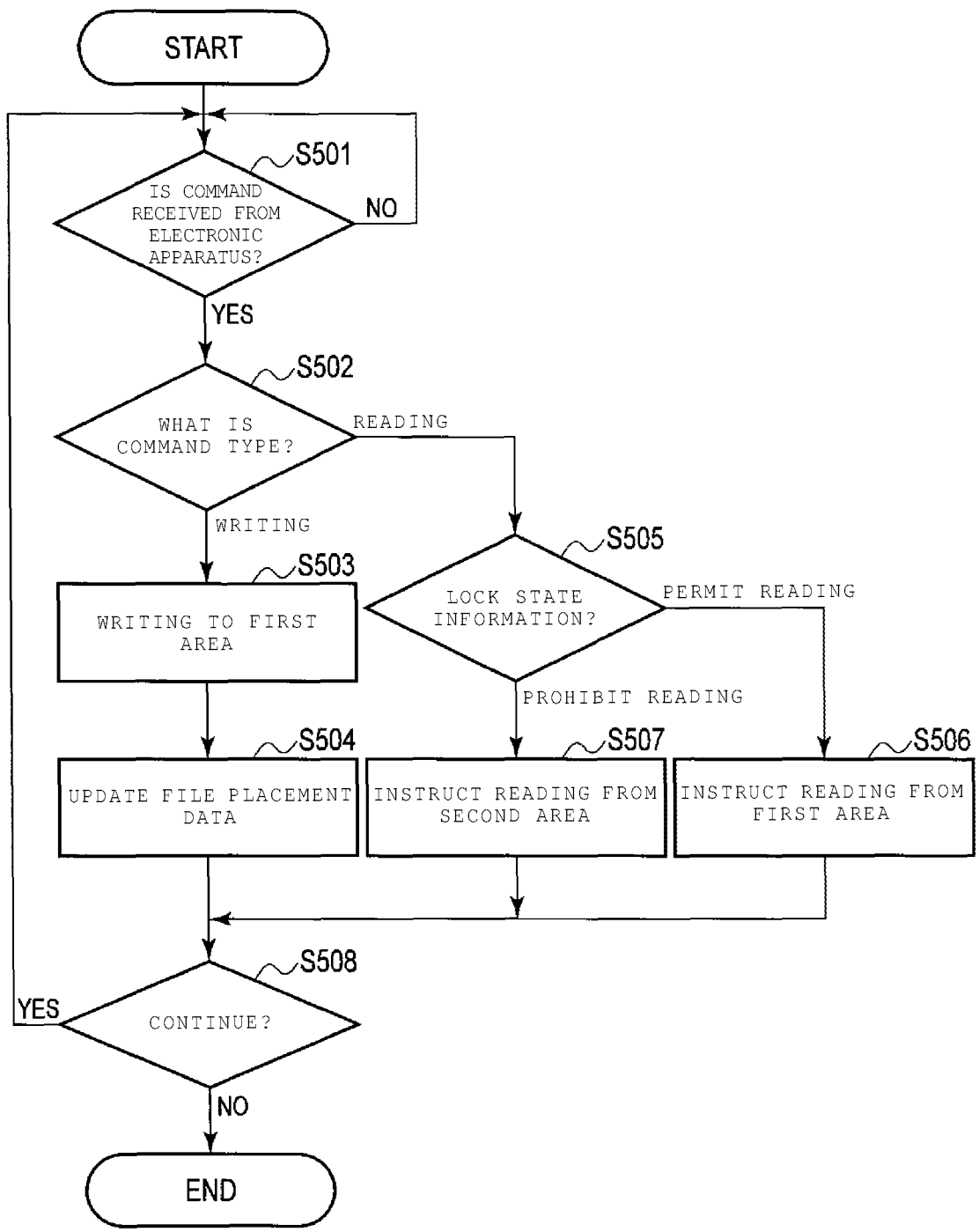
FIG. 9 is a flowchart illustrating an example of a read lock mode process of the wireless storage apparatus according to the second embodiment.

FIG. 9 is a flowchart illustrating an example of a read lock mode process of the wireless storage apparatus 3A according to the present embodiment. The process of FIG. 9 corresponds to step S305 of FIG. 7.

In step S501, the controller 33 determines whether or not a write command or a read command is received from the electronic apparatus 2 through the connector 36, and repeats the determination of step S501 until the write command or the read command is received.

In step S502, the controller 33 determines which one of the write command and the read command is received from the electronic apparatus 2 through the connector 36.

When it is determined that the write command is received, in step S503, the controller 33 instructs the memory controller 35 to perform writing to the first area 32A of the nonvolatile memory 32. The memory controller 35 writes the file 54A to the first area 32A.

In step S504, the controller 33 updates the file placement data 53A in the first area 32A, and similarly updates the file placement data 53B in the second area 32B, through the memory controller 35.

On the other hand, if it is determined in step S502 that the read command is received, in step S505, the controller 33 receives the lock state information F3 of the wireless communication memory 37 through the communication controller 34, and determines whether or not the received lock state information F3 permits reading from the first area 32A.

If the reading of the lock state information F3 from the first area 32A is permitted, the controller 33 instructs the memory controller 35 to read a file from the first area 32A instep S506. The memory controller 35 reads the file 54A from the first area 32A and transmits the read file 54A to the controller 33. The controller 33 transmits the file 54A received from the memory controller 35 to the electronic apparatus 2 through the connector 36. Thereafter, the process proceeds to step S508.

On the other hand, if the reading of the lock state information F3 from the first area 32A is not permitted, the controller 33 instructs the memory controller 35 to read the dummy file 54B from the second area 32B, in step S507. The memory controller 35 reads the dummy file 54B from the second area 32B and transmits the read dummy file 54B to the controller 33. The controller 33 transmits the dummy file 54B received from the memory controller 35 to the electronic apparatus 2 through the connector 36. Thereafter, the process proceeds to step S508.

In step S513, the controller 33 determines whether or not to continue the process. If the process is not to be continued, the process ends; and if the process is to be continued, the process proceeds to step S501.

In the present embodiment, when the reading of a file from the first area 32A is not permitted in the read lock mode, the controller 33 may search, for example, the second area 32B of the nonvolatile memory 32, and return the results of searching for the second area 32B to the transmitter of the search command, in response to the received search command.

When reading the dummy file 54B through the memory controller 35, the controller 33 may transmit the dummy file 54B and information for notifying that the transmitted data is dummy, to the destination of the dummy file 54B.

When the reading of a file from the first area 32A is not permitted in the read lock mode, the controller 33 may permit or prohibit the deletion of the file from the first area 32A.

The above is a description of a lock/unlock mode and a read lock mode when a read command or a write command is received from the electronic apparatus 2. The operations in the lock/unlock mode and the read lock mode as described above can also be used when data of the nonvolatile memory 32 is written to the wireless communication memory 37 by the mirroring unit 331.

More specifically, the mirroring unit 331 first reads the read lock flag F2 and the lock state information F3 from the wireless communication memory 37 through the communication controller 34 at the mirroring execution timing.

When the read lock flag F2 is ON and the lock state information F3 indicates that reading is prohibited, the mirroring unit 331 reads the dummy file 54B from the nonvolatile memory 32 through the memory controller 35 and stores the dummy file 54B in the wireless communication memory 37 through the communication controller 34. When the information processing apparatus 4 reads the data in the wireless storage apparatus 3A, the information processing apparatus 4 receives the dummy file 54B stored in the wireless communication memory 37.

The mirroring unit 331 does not read data from the nonvolatile memory 32, when the lock state information F3 indicates that reading is prohibited, in the lock/unlock mode.

When the lock state information F3 indicates that writing is prohibited, the mirroring unit 331 does not write the data stored in the wireless communication memory 37 to the nonvolatile memory 32.

When the lock state information F3 indicates that writing is permitted, the mirroring unit 331 is able to write the data stored in the wireless communication memory 37 to the first area 32A of the nonvolatile memory 32.

In the present embodiment described above, the controller 33 can perform switching between the lock/unlock mode and read lock mode, according to the read lock flag F2 stored in the wireless communication memory 37 of the wireless storage apparatus 3A. In the read lock mode, the controller 33 stores the data in the first area 32A of the nonvolatile memory 32 when receiving the write command, and reads data from the second area 32B of the nonvolatile memory 32 when receiving the read command. That is, the controller 33 can read the dummy file 54B corresponding to the data to be read. Thus, the security of the wireless storage apparatus 3A is enhanced and leakage of confidential information can be prevented, as compared with the case where reading is prohibited, in the lock/unlock mode.

In the present embodiment, the wireless storage apparatus 3 can be easily carried, and even if the wireless storage apparatus 3 is lost or stolen, it is possible to ensure security, and protect the privacy of the user. If the authentication succeeds, the user can switch between the read lock mode and the lock/unlock mode, switch between reading possible and impossible, switch between writing possible and impossible, for example, by simply moving the information processing apparatus 4 such as a set smartphone close to the wireless storage apparatus 3. Therefore, the user can easily and quickly switch the security mode according to the user's own intention. Further, the workload of the user is reduced.

Third Embodiment

In the present embodiment, a modification of the read lock mode according to the second embodiment will be described.

In the present embodiment, it is assumed that the wireless storage apparatus 3B operates in one of the lock/unlock mode and the read lock mode, similarly to the wireless storage apparatus 3A according to the second embodiment. The switching process between the lock/unlock mode and the read lock mode (see FIG. 7), and the lock/unlock mode process (see FIG. 8) are the same as in the second embodiment.

Also in the present embodiment, when mirroring is performed by the mirroring unit 331, the mirroring unit 331 performs reading and writing of data according to the lock/unlock mode and the read lock mode.

In the read lock mode according to the second embodiment, the storage area of the nonvolatile memory 32 is divided into a first area 32A and a second area 32B. When the controller 33 receives a write command, data is written in the first area. When the controller 33 receives the read command and reading of data is prohibited, data is read from the second area.

On the other hand, in the read lock mode according to the present embodiment, the controller 33 stores management data for managing whether to permit reading of the data from the nonvolatile memory 32. Based on the management data, the controller 33 determines whether or not to read the data to be read. Thus, in the read lock mode according to the present embodiment, division of the storage area of the nonvolatile memory 32 becomes unnecessary, and the nonvolatile memory 32 can be efficiently used.

Figure 10:
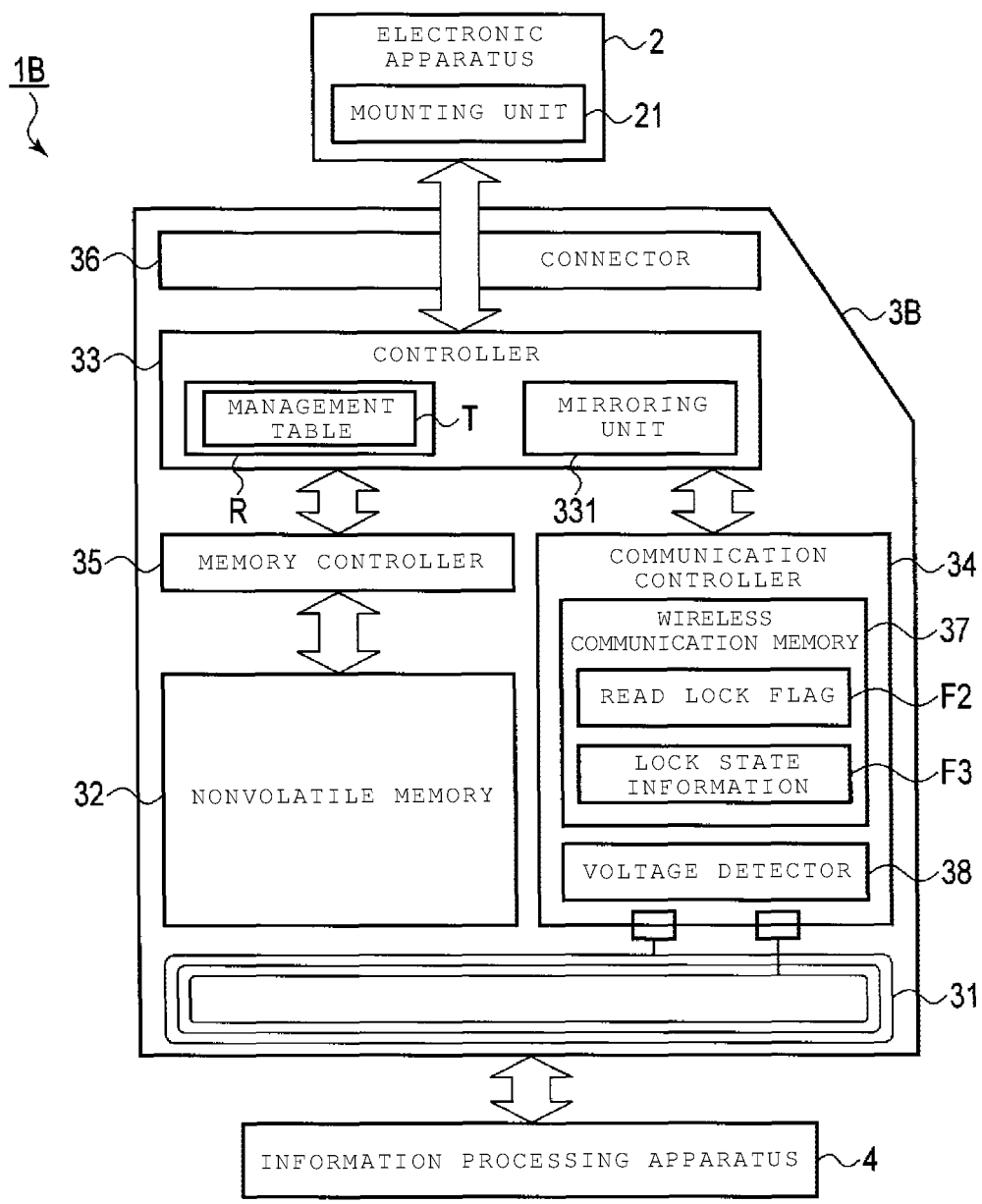
FIG. 10 is a block diagram illustrating an example of a storage apparatus having a wireless communication function according to a third embodiment and an information processing system including the storage apparatus.

FIG. 10 is a block diagram illustrating an example of a configuration of a wireless storage apparatus according to the present embodiment and an information processing system including the wireless storage apparatus.

The information processing system 1B includes an electronic apparatus 2, a wireless storage apparatus 3B, and an information processing apparatus 4. A description of the same components as those included in the wireless storage apparatus 3 according to the first embodiment or the wireless storage apparatus 3A according to the second embodiment, among the components included in the wireless storage apparatus 3B according to the present embodiment will be omitted.

The controller 33 of the wireless storage apparatus 3B includes a memory R. The controller 33 uses the management table T stored in the memory R to determine whether or not to permit reading on a per predetermined data unit basis of the nonvolatile memory 32. The details of the management table T will be described with reference to FIG. 11. The memory R may be provided outside the controller 33.

In the read lock mode, the controller 33 controls, for example, access and mirroring to the nonvolatile memory 32 from the electronic apparatus 2.

More specifically, when the controller 33 receives a read command for the nonvolatile memory 32 from the electronic apparatus 2 through the connector 36, the controller 33 reads the read lock flag F2 from the wireless communication memory 37 through the communication controller 34. The controller 33 determines whether or not the read lock mode is on, based on the read lock flag F2. When the read lock mode is on, the controller 33 refers to the management table T and determines whether or not the reading of the target data of the read command is permitted. When reading of the data is permitted, the controller 33 reads the data from the nonvolatile memory 32 through the memory controller 35 and transmits the read data to the electronic apparatus 2 through the connector 36. If reading of the data is not permitted, the controller 33 transmits the dummy data generated by the controller 33 or a response indicating that reading of the data is prohibited, to the electronic apparatus 2 through the connector 36.

The controller 33 may generate, for example, random data as dummy data, or may automatically generate data that does not need to be in a secret state.

During mirroring, the mirroring unit 331 reads the read lock flag F2 from the wireless communication memory 37 through the communication controller 34 at the mirroring execution timing. The mirroring unit 331 determines whether or not the read lock mode is on, based on the read lock flag F2. When the read lock mode is on, the mirroring unit 331 refers to the management table T and determines whether or not the reading of the target data of the read command is permitted. When reading of the data is permitted, the mirroring unit 331 reads the data from the nonvolatile memory 32 through the memory controller 35, and stores the read data in the wireless communication memory 37 through the communication controller 34. When reading of the data is not permitted, the mirroring unit 331 stores the dummy data generated by the controller 33 or a response indicating that reading of the data is prohibited, in the wireless communication memory 37 through the communication controller 34.

Figure 11:
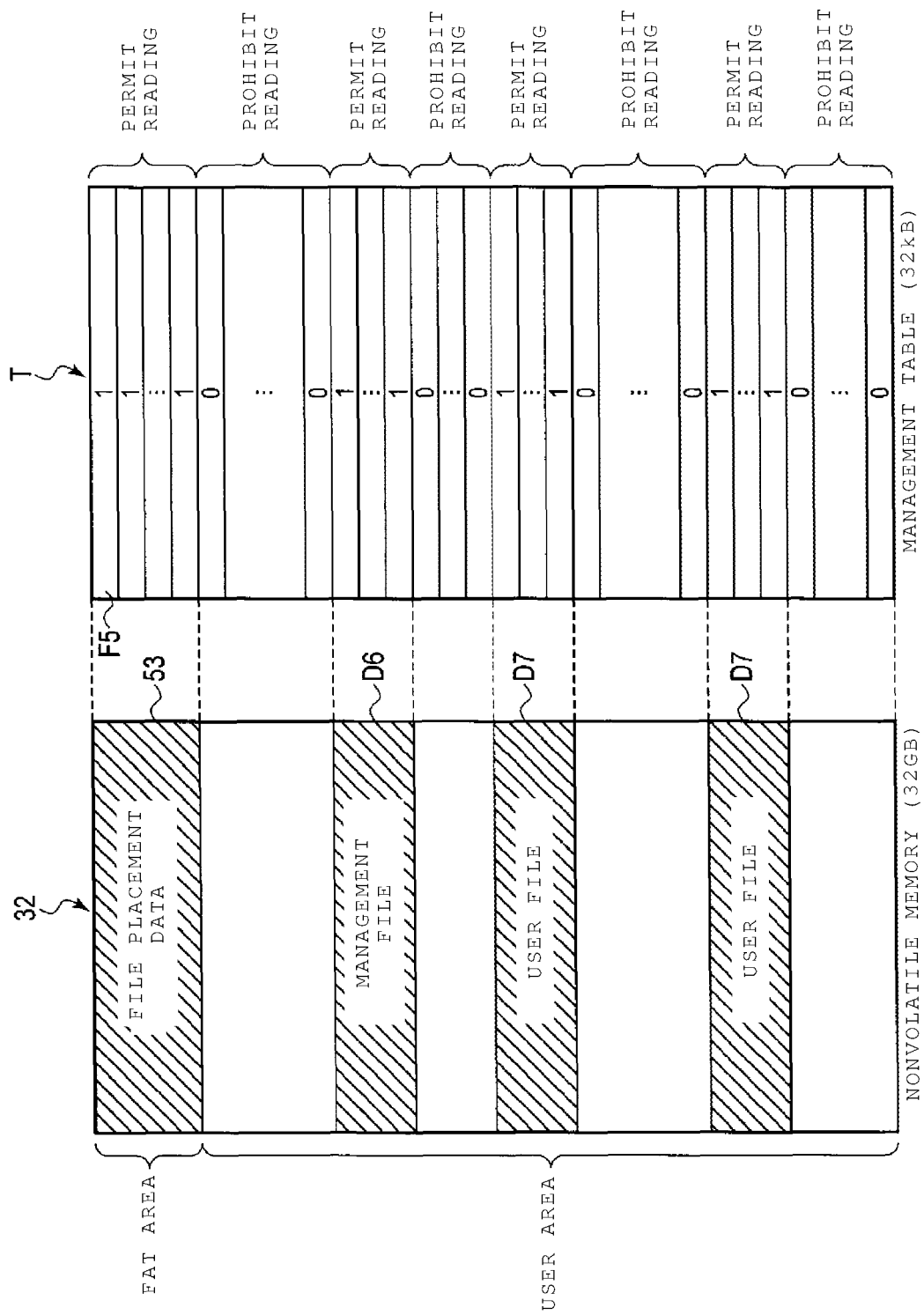
FIG. 11 is a diagram illustrating an example of a relationship between a management table and a nonvolatile memory, according to the third embodiment.

FIG. 11 is a diagram illustrating an example of a relationship between the management table T and the nonvolatile memory 32 according to the present embodiment.

The management table T includes a read permission flag F5 indicating whether or not reading of the data from the nonvolatile memory 32 is permitted, on a per predetermined data unit (size) basis of the nonvolatile memory 32. When the read permission flag F5 corresponding to the data stored in the nonvolatile memory 32 is on, the data can be read. When the read permission flag F5 corresponding to the data is off, reading of the data is prohibited.

In the following description, it is assumed that the predetermined unit is, for example, 128 kilobytes. In this case, as shown in FIG. 11, for example, when the nonvolatile memory 32 has a size of 32 gigabytes, the size of the management table T is 32 kilobytes. The predetermined unit can be arbitrarily changed depending on the type of the nonvolatile memory 32 or the type, property, size, and the like of the data stored in the nonvolatile memory 32.

As described above, each read permission flag F5 is associated with data of a predetermined size stored in the nonvolatile memory 32. The initial value of the read permission flag F5 may be determined in advance by, for example, the controller 33 depending on the type of data of a predetermined size associated with the read permission flag F5. In this case, with respect to the data of the predetermined size stored in the nonvolatile memory 32, the controller 33 determines the type of the data, generates a management table T in association with the identification information of the data and the initial value corresponding to the type of the data, and stores the management table T in the memory R.

The nonvolatile memory 32 includes file placement data 53. The file placement data 53 records the file ID and the position of the file stored in the nonvolatile memory 32 in association with each other. The controller 33 is able to recognize which file is placed in which position of the nonvolatile memory 32 with reference to the file placement data 53, through the memory controller 35.

The file placement data 53 may be placed, for example, in the FAT area of the nonvolatile memory 32. The file placement data 53 may be stored, for example, at the beginning of the nonvolatile memory 32.

The controller 33 sets, for example, the initial value of the read permission flag F5 corresponding to the file placement data 53 to ON, before the electronic apparatus 2 reads or writes data from or to the wireless storage apparatus 3B.

The nonvolatile memory 32 includes, for example, the management file D6 and the user file D7 in the user area.

The management file D6 is, for example, a system file used when the electronic apparatus 2 manages the wireless storage apparatus 3B. For example, when the wireless storage apparatus 3B is mountable on a plurality of electronic apparatuses, and an individual management file is required for each of the plurality of electronic apparatuses, a plurality of management files respectively corresponding to the plurality of electronic apparatuses may be stored in the nonvolatile memory 32. In this case, the controller 33 may be able to determine which management file is associated with which electronic apparatus by an extension attached to each management file.

Similar to the case of the file placement data 53, it is preferable that the initial value of the read permission flag F5 corresponding to the management file D6 is set to ON and reading is permitted.

The user file D7 is, for example, a file (user data) such as a document, a moving image, and an image, which is written, in response to a command from the electronic apparatus 2 or the information processing apparatus 4. In the read lock mode, it is preferable that the initial value of the read permission flag of the user file D7 is off, and the reading of the user file D7 is prohibited. Thus, the security of the user file D7 is secured.

However, a specific user file D7 is made readable under predetermined conditions, thereby improving the convenience of the user. For example, when the controller 33 which is supplied with power from the electronic apparatus 2 writes the user file D7 to the nonvolatile memory 32 through the memory controller 35, the controller 33 may be able to read the user file D7 while the power is continuously supplied from the electronic apparatus 2. Thus, until the power supply from the electronic apparatus 2 to the wireless storage apparatus 3B is stopped after the user file D7 is written to the wireless storage apparatus 3B, the electronic apparatus 2 can read the written user file D7 from the wireless storage apparatus 3B and display it. Therefore, the user can check whether or not the written data is normally stored in the wireless storage apparatus 3B, using the electronic apparatus 2. Once power supply from the electronic apparatus 2 to the wireless storage apparatus 3B is stopped and power supply from the electronic apparatus 2 to the wireless storage apparatus 3B is resumed, the controller 33 sets the read permission flag of the user file D7 to an initial value (Off), and prohibits reading of the user file D7 until the read lock mode is released.

Similarly, the controller 33 may update the management table T such that reading of the user file D7 is permitted for a predetermined period after the user file D7 is written to the nonvolatile memory 32 and reading of the user file D7 is not permitted when a predetermined period elapses. In this case, the user can easily check the contents of the user file D7 for a predetermined period after writing the user file D7.

The controller 33 may identify the type of the electronic apparatus 2 and determine the type of data for which reading is permitted depending on the type of the electronic apparatus 2. In this case, the controller 33 sets ON the initial value of the read permission flag F5 corresponding to the data for which reading is determined to be permitted.

Figure 12:
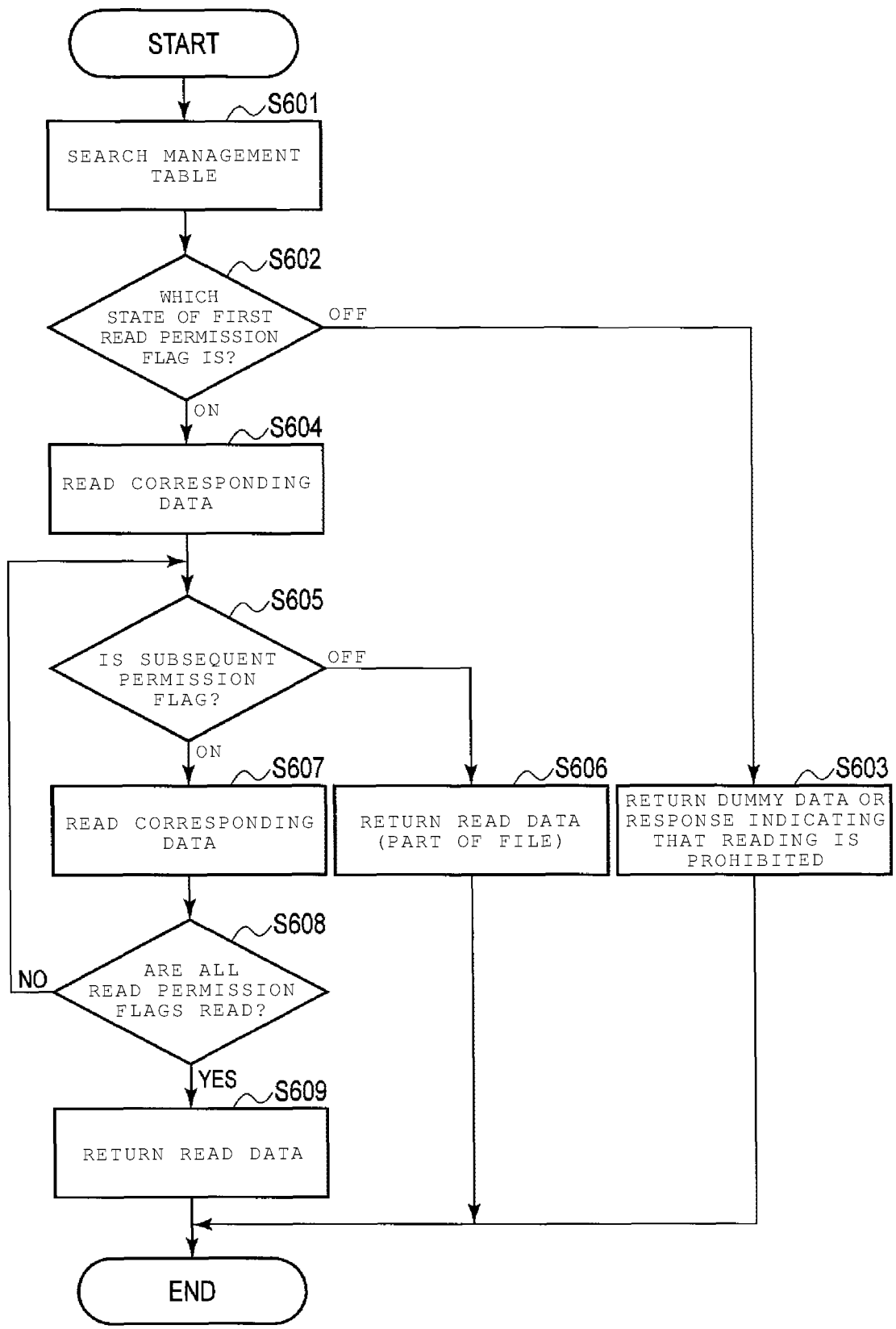
FIG. 12 is a flowchart illustrating an example of a file reading process in a read lock mode, according to the third embodiment.

FIG. 12 is a flowchart illustrating an example of a file reading process in a read lock mode according to the third embodiment.

In read lock mode, if the file size of user file D7 is larger than the data size managed by the read permission flag F5, a plurality of read permission flags F5 are associated with one user file D7. FIG. 12 illustrates a process in which the controller 33 reads the user file D7 through the memory controller 35.

In step S601, the controller 33 searches the management table T, and reads the first read permission flag F5 corresponding to the data in the head portion of the user file D7.

In step S602, the controller 33 determines whether the first read permission flag F5 is on or off.

When the first read permission flag F5 is off, the controller 33 determines that the user file D7 is not readable, and returns the dummy data generated by the controller 33 or informs that reading of the user file D7 is prohibited, in step S603. Thus, reading of data for which reading is not permitted is locked.

When the first read permission flag F5 is on, the controller 33 reads data of the size not greater than the size corresponding to the first read permission flag F5 from the user files D7 in step S604.

In step S605, the controller 33 reads the subsequent read permission flag F5 of the first read permission flag F5. When the subsequent read permission flag F5 is off, the controller 33 returns the read data, as the part data of the user file D7, in step S606.

When the subsequent read permission flag F5 is on, the controller 33 further reads data of the size not greater than the size corresponding to the subsequent read permission flag F5 from the user files D7 in step S607.

In step S608, the controller 33 determines whether or not all read permission flags F5 corresponding to the user file D7 are read. If there is a read permission flag F5 which is not read, the process returns to step S605.

When all read permission flags F5 are read, the controller 33 returns the read data as the data of the user file D7 in step S609.

Figure 13:
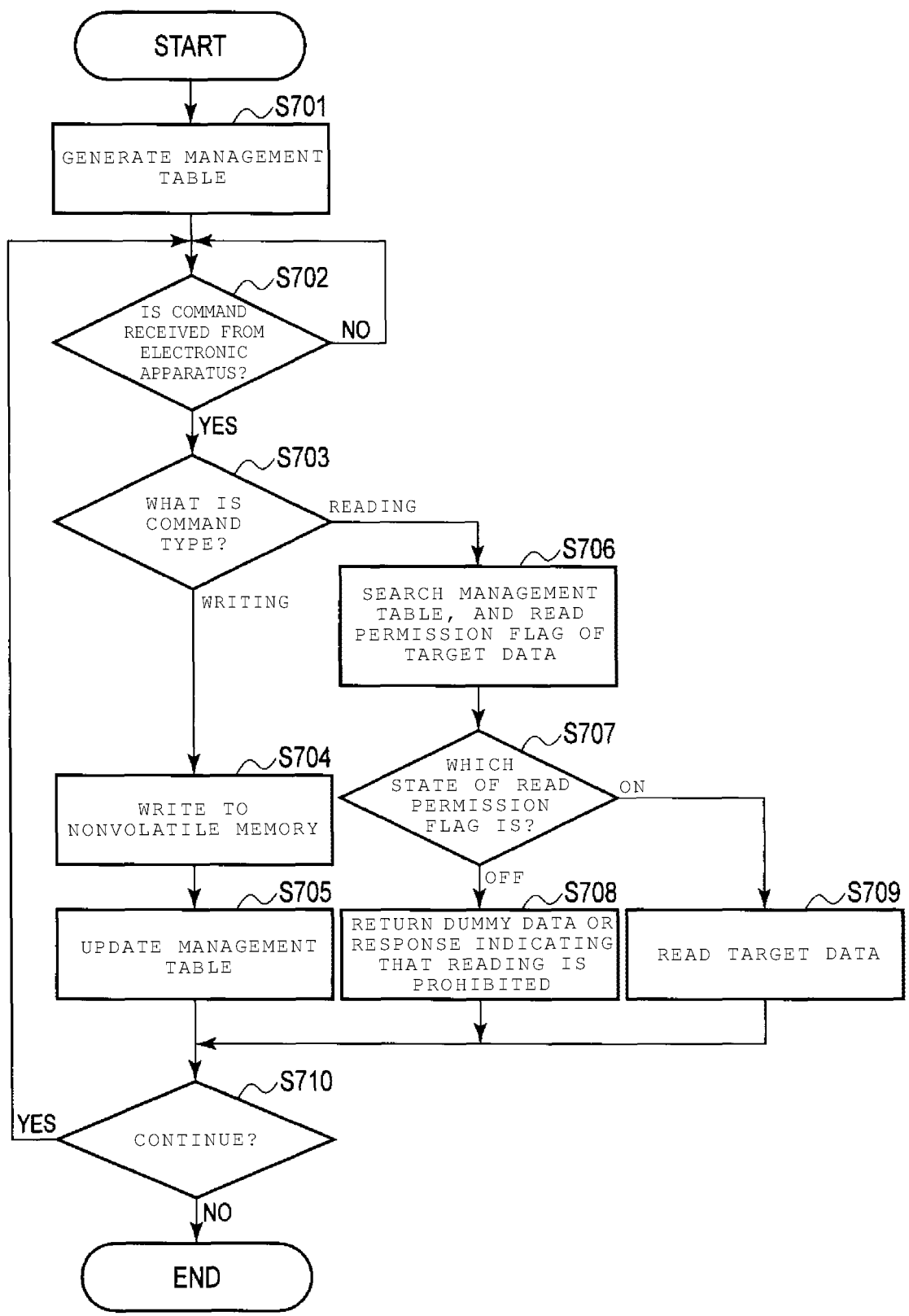
FIG. 13 is a flowchart illustrating an example from generation of a management table in the read lock mode to execution of a process corresponding to a received command, according to the third embodiment.

FIG. 13 is a flowchart illustrating an example from the generation of a management table T in the read lock mode to the execution of processes corresponding to the received command, which is executed by the wireless storage apparatus 3B according to the present embodiment. The reading process from step S706 to step S709 in FIG. 13 corresponds to the flowchart illustrated in FIG. 12, but it is illustrated in a simpler manner than the flowchart in FIG. 12.

In the case of the read lock mode, the controller 33 reads the file placement data 53 from the nonvolatile memory 32 through the memory controller 35 in step S701, and generates a management table T indicating whether or not to permit reading of data, in the read lock mode, based on the information on the file placement data 53. The controller 33 stores the generated management table T in the memory R.

Since the process of step S702 and step S703 is the same as the process of step S501 and step S502 of FIG. 9, the description thereof will be omitted.

When it is determined that the write command is received in step S703, the controller 33 instructs the memory controller 35 to write the writing target file in step S704. The memory controller 35 writes the writing target file to the nonvolatile memory 32.

In step S705, the controller 33 updates the file placement data 53 of the nonvolatile memory 32 through the memory controller 35, based on the placement state of the file of the nonvolatile memory 32 after the writing target file is written, and updates the management table T of the memory R.

On the other hand, in a case where it is determined that the read command is received in step S703, the controller 33 searches the management table T, and reads a read permission flag F5 of a read target file, in step S706.

In step S707, the controller 33 determines whether the state of the read permission flag F5 of the read target file is on or off.

When the read permission flag F5 is off, the controller 33 transmits the dummy data generated by the controller 33 or a response indicating that reading of the read target file is prohibited, to the electronic apparatus 2 through the connector 36 in step S708. Thus, reading of data for which reading is not permitted is locked.

On the other hand, if the read permission flag F5 is on, the controller 33 instructs the memory controller 35 to read the read target file from the nonvolatile memory 32, in step S709. The memory controller 35 reads the read target file from the nonvolatile memory 32 and transmits the read file to the controller 33. The controller 33 transmits the reading target file received from the memory controller 35 to the electronic apparatus 2 through the connector 36.

In step S710, the controller 33 determines whether or not to continue the process. If the process is not to be continued, the process ends; and if the process is to be continued, the process proceeds to step S702.

The above is a description of a read lock mode when a read command or a write command is received from the electronic apparatus 2. The operations in the read lock mode as described above can also be used when data of the nonvolatile memory 32 is written to the wireless communication memory 37 by the mirroring unit 331.

More specifically, the mirroring unit 331 first reads the read lock flag F2 from the wireless communication memory 37 through the communication controller 34 at the mirroring execution timing.

The mirroring unit 331 generates dummy data for data whose read lock flag F2 is ON and of which reading is not permitted in the management table T stored in the memory R, and stores the dummy data in the wireless communication memory 37 through the communication controller 34. When the information processing apparatus 4 reads the data in the wireless storage apparatus 3A, the information processing apparatus 4 receives the dummy data stored in the wireless communication memory 37.

In the present embodiment described above, the controller 33 stores a management table T for managing whether to permit reading for the data stored in the nonvolatile memory 32. In the read lock mode, the controller 33 generates dummy data for the read-prohibited data stored in the nonvolatile memory 32 and transmits the dummy data to the electronic apparatus 2 or the communication controller 34. Therefore, in the read lock mode according to the present embodiment, it is unnecessary to divide the storage area of the nonvolatile memory 32 and store the dummy data in one area. This reduces the processing load of the wireless storage apparatus 3, because synchronization of file placement data between divided areas, and preparation for dummy data corresponding to user data are not needed. Since the user-writable user area is not halved, the convenience of the user is improved. Since the same user area can be used in the lock/unlock mode and the read lock mode, high convenience can be ensured even when the user switches between the lock/unlock mode and the read lock mode.

In the present embodiment, the case of restricting reading of data from the wireless storage apparatus 3 by the electronic apparatus 2 in the read lock mode is described, but the same can apply to the case of restricting reading of data from the wireless storage apparatus 3 by the information processing apparatus 4 through wireless communication. In this case, for example, the wireless storage apparatus 3 receives a read command and information designating data to be read (hereinafter, referred to as designation information) from the information processing apparatus 4 through the communication controller 34, and stores it in the wireless communication memory 37. When electric power is supplied from the electronic apparatus 2 to the controller 33, the controller 33 confirms the designation information stored in the wireless communication memory 37 and searches the management table T to check the read permission flag corresponding to data in the nonvolatile memory 32 indicated by the designation information. When the read permission flag is on, the controller 33 reads the data in the nonvolatile memory 32 indicated by the designation information from the nonvolatile memory 32 through the memory controller 35, and transmits the data in the nonvolatile memory 32 indicated by the designation information to the information processing apparatus 4 through the communication controller 34. If the read permission flag is off, the controller 33 transmits the generated dummy data or a response indicating that the reading the data in the nonvolatile memory 32 indicated by the designation information is prohibited, to the information processing apparatus 4 through the communication controller 34.

Although the case where the wireless storage apparatus 3 is an SD card is described in the present embodiment, the wireless storage apparatus 3 can also be applied to various other recording mediums such as SxS® and SSD.

In the present embodiment, a description is made that the read lock flag F2 is stored in the wireless communication memory 37. Thus, even if power is not supplied from the electronic apparatus 2 to the controller 33, the state of the read lock flag F2 can be changed through the wireless communication between the information processing apparatus 4 and the wireless storage apparatus 3B, thereby improving convenience of the user.

However, the read lock flag F2 maybe stored in the memory R of the controller 33. In this case, the read lock flag F2 can be changed only when electric power is supplied from the electronic apparatus 2 to the controller 33, thereby preventing the read lock flag F2 from being changed in a state where the wireless storage apparatus 3B is not mounted on the electronic apparatus 2. This increases the security of the wireless storage apparatus 3B.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A storage apparatus comprising:
    a first memory, which is nonvolatile;
    a first controller that controls the first memory;
    a wireless antenna;
    a second memory, which is operable based on power supplied from the wireless antenna; and
    a second controller that is operable based on the power supplied from the wireless antenna, and performs communication using the wireless antenna,
    wherein the second controller
        when performing communication with a first external apparatus using the wireless antenna, performs authentication of the first external apparatus and determines whether the authentication succeeded or failed, and
        if it is determined that the authentication succeeded, permits reading by the first external apparatus of first data from the second memory by communication using the wireless antenna or writing by the first external apparatus of second data to the second memory by communication using the wireless antenna, and if it is determined that the authentication failed, prohibits reading by the first external apparatus of any data from the second memory by communication using the wireless antenna or writing by the first external apparatus of any data to the second memory by communication using the wireless antenna.

2. The storage apparatus according to claim 1, wherein if it is determined that the authentication succeeded,
the second controller receives from the first external apparatus through the wireless antenna, designation information for designating the first data or designating a storage area for the first data in the first memory, and stores the designation information in the second memory, and
the first controller reads the first data indicated by the designation information from the first memory, and the second controller transmits the first data read by the first controller to the first external apparatus through the wireless antenna.

3. The storage apparatus according to claim 2, wherein the second controller encrypts the first data read by the first controller using encryption key information stored in the second memory and transmits the encrypted first data to the first external apparatus through the wireless antenna.

4. The storage apparatus according to claim 1, wherein if it is determined that the authentication succeeded,
the second controller receives from the first external apparatus through the wireless antenna, the second data and designation information for designating a storage area for the second data in the first memory, and stores the second data and the designation information in the second memory, and
the first controller stores the second data in a storage area in the first memory designated by the designation information.

5. The storage apparatus according to claim 1, further comprising:
a mirroring unit,
wherein if it is determined that the authentication succeeded, the mirroring unit performs mirroring of the first data stored in the first memory in the second memory or mirroring of the second data stored in the second memory in the first memory.

6. The storage apparatus according to claim 5, further comprising:
a main controller that communicates with the first controller and the second controller,
wherein the mirroring unit is implemented in the main controller.

7. The storage apparatus according to claim 1, wherein the second controller determines that the authentication succeeded when authentication key information stored in the second memory and authentication key information received from the first external apparatus through the wireless antenna match.

8. The storage apparatus according to claim 1, wherein the second controller stores in the second memory an authentication state indicating whether the authentication succeeded or failed, and
the second controller changes the authentication state to indicate that the authentication failed after completion of the communication using the wireless antenna.

9. The storage apparatus according to claim 1, further comprising:
a connector electrically connectable to a second external apparatus,
wherein the first memory is operable based on power supplied from the second external apparatus through the connector.

10. The storage apparatus according to claim 9, wherein the second controller determines that the authentication failed when the connector is not electrically connected to the second external apparatus.

11. An operation method of a storage apparatus including a first memory, which is nonvolatile, a first controller that controls the first memory, a wireless antenna, a second memory operable based on power supplied from the wireless antenna, and a second controller that is operable based on the power supplied from the wireless antenna and performs communication using the wireless antenna, the method comprising:
when communication with a first external apparatus using the wireless antenna is performed, performing, by the second controller, authentication of the first external apparatus and determines whether the authentication succeeded or failed;
if it is determined that the authentication succeeded, permitting, by the second controller, reading by the first external apparatus of first data from the second memory by communication using the wireless antenna or writing by the first external apparatus of second data to the second memory by communication using the wireless antenna; and
if it is determined that the authentication failed, prohibiting, by the second controller, reading by the first external apparatus of any data from the second memory by communication using the wireless antenna or writing by the first external apparatus of any data to the second memory by communication using the wireless antenna.

12. The method according to claim 11, further comprising, if it is determined that the authentication succeeded:
by the second controller, receiving from the first external apparatus through the wireless antenna, designation information for designating the first data or designating a storage area for the first data in the first memory, and storing the designation information in the second memory; and
reading, by the first controller, the first data indicated by the designation information from the first memory, and transmitting, by the second controller, the first data read by the first controller to the first external apparatus through the wireless antenna.

13. The method according to claim 12, further comprising, if it is determined that the authentication succeeded:
by the second controller, encrypting the first data read by the first controller using encryption key information stored in the second memory and transmitting the encrypted first data to the first external apparatus through the wireless antenna.

14. The method according to claim 11, further comprising, if it is determined that the authentication succeeded:
by the second controller, receiving from the first external apparatus through the wireless antenna, the second data and designation information for designating a storage area for the second data in the first memory, and storing the second data and the designation information in the second memory; and
by the first controller, storing the second data in a storage area in the first memory designated by the designation information.

15. The method according to claim 11, further comprising, if it is determined that the authentication succeeded:
performing mirroring of the first data stored in the first memory in the second memory or mirroring of the second data stored in the second memory in the first memory.

16. The method according to claim 15, wherein the storage apparatus further includes amain controller that communicates with the first controller and the second controller, and the mirroring is performed by the main controller.

17. The method according to claim 11, wherein it is determined that the authentication succeeded when authentication key information stored in the second memory and authentication key information received from the first external apparatus through the wireless antenna match.

18. The method according to claim 11, further comprising:
- storing in the second memory an authentication state indicating whether the authentication succeeded or failed;
- changing, by the second controller, the authentication state to indicate that the authentication failed after completion of the communication using the wireless antenna.

19. The method according to claim 11, wherein the storage apparatus further includes a connector electrically connectable to a second external apparatus,
- wherein the first memory is operable based on power supplied from the second external apparatus through the connector.

20. The method according to claim 19, wherein it is determined that the authentication failed when the connector is not electrically connected to the second external apparatus.

* * * * *